US009926891B2

(12) United States Patent
Zurlo et al.

(10) Patent No.: US 9,926,891 B2
(45) Date of Patent: Mar. 27, 2018

(54) SYSTEM AND METHOD OF EXHAUST GAS RECIRCULATION

(71) Applicant: General Electric Company, Schenectady, NY (US)

(72) Inventors: James Richard Zurlo, Madison, WI (US); Kenneth Edward Neuman, Waukesha, WI (US); Kevin Paul Konkle, West Bend, WI (US); Brian Joseph Murphy, Pewaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 162 days.

(21) Appl. No.: 14/945,322

(22) Filed: Nov. 18, 2015

(65) Prior Publication Data

US 2017/0138319 A1    May 18, 2017

(51) Int. Cl.
| F02M 25/00 | (2006.01) |
| F02M 26/19 | (2016.01) |
| F02M 26/06 | (2016.01) |
| F02M 26/36 | (2016.01) |
| F02M 35/10 | (2006.01) |
| F02M 25/06 | (2016.01) |
| F02M 26/50 | (2016.01) |
| F02M 26/17 | (2016.01) |

(Continued)

(52) U.S. Cl.
CPC ............ *F02M 26/19* (2016.02); *F02M 25/06* (2013.01); *F02M 26/06* (2016.02); *F02M 26/17* (2016.02); *F02M 26/18* (2016.02); *F02M 26/36* (2016.02); *F02M 26/50* (2016.02); *F02M 35/10222* (2013.01); *F01M 2013/0038* (2013.01)

(58) Field of Classification Search
CPC .... F02M 26/00; F02M 26/36; F02M 25/0742; F02M 25/07; F02D 21/08; F02D 21/10; F01N 2240/00; F02B 47/08
USPC ................................ 123/568.15, 3; 60/605.2
See application file for complete search history.

(56) References Cited

U.S. PATENT DOCUMENTS

| 3,667,436 A | * | 6/1972 | Reichhelm | ............. | F02M 31/18 |
| | | | | | 123/549 |
| 3,828,736 A | * | 8/1974 | Koch | ........................ | F23R 3/40 |
| | | | | | 123/1 A |

(Continued)

FOREIGN PATENT DOCUMENTS

| DE | 2925495 A1 | 1/1981 |
| FR | 2999251 A1 | 6/2014 |

(Continued)

OTHER PUBLICATIONS

International Search Report and Written Opinion issued in connection with corresponding Application No. PCT/US2016/052132 dated Dec. 12, 2016.

*Primary Examiner* — Thomas Moulis
(74) *Attorney, Agent, or Firm* — Fletcher Yoder, P.C.

(57) ABSTRACT

A system includes an exhaust gas an exhaust gas recirculation (EGR) mixer which includes a housing and a first passage in the housing. The first passage may be configured to supply an EGR flow into the housing. The system further includes a second passage in the housing, such that the second passage is disposed about the first passage. The second passage is configured to supply at least one fluid flow into the housing. The system also includes a region downstream from the first and second passages, and a fluid outlet downstream from the region.

21 Claims, 10 Drawing Sheets

(51) Int. Cl.
*F02M 26/18* (2016.01)
*F01M 13/00* (2006.01)

(56) References Cited

U.S. PATENT DOCUMENTS

| | | | | |
|---|---|---|---|---|
| 3,901,197 A * | 8/1975 | Noguchi | | F02B 53/02 |
| | | | | 123/3 |
| 4,027,635 A * | 6/1977 | Goto | | F02M 26/60 |
| | | | | 123/568.15 |
| 4,212,162 A * | 7/1980 | Kobayashi | | F02G 1/02 |
| | | | | 123/3 |
| 4,270,508 A * | 6/1981 | Lindberg | | F01M 13/023 |
| | | | | 123/25 A |
| 4,635,609 A | 1/1987 | Seppen et al. | | |
| 5,297,515 A * | 3/1994 | Gale | | F02M 27/02 |
| | | | | 123/3 |
| 5,379,728 A * | 1/1995 | Cooke | | F02B 43/08 |
| | | | | 123/3 |
| 5,425,347 A | 6/1995 | Zinke | | |
| 6,044,827 A | 4/2000 | Pfaff et al. | | |
| 6,074,619 A * | 6/2000 | Schoubye | | B01D 53/9431 |
| | | | | 423/213.2 |
| 6,079,373 A * | 6/2000 | Kawamura | | F01N 3/0857 |
| | | | | 123/3 |
| 6,314,919 B1 * | 11/2001 | Pugachev | | F02M 23/02 |
| | | | | 123/3 |
| 6,921,595 B2 * | 7/2005 | Clawson | | H01M 8/04022 |
| | | | | 429/412 |
| 6,935,283 B2 * | 8/2005 | Glew | | F02M 31/08 |
| | | | | 123/3 |
| 7,059,118 B2 * | 6/2006 | Ripper | | B01F 5/0268 |
| | | | | 60/286 |
| 7,281,530 B2 * | 10/2007 | Usui | | F02M 35/10222 |
| | | | | 123/568.11 |
| 7,568,340 B2 | 8/2009 | Marsal et al. | | |
| 7,581,387 B2 * | 9/2009 | Bui | | F01N 3/101 |
| | | | | 60/274 |
| 7,624,575 B2 | 12/2009 | Noelle et al. | | |
| 7,730,878 B2 * | 6/2010 | Shieh | | B01F 3/02 |
| | | | | 123/568.17 |
| 7,740,008 B2 | 6/2010 | Brogdon et al. | | |
| 7,797,937 B2 * | 9/2010 | Endicott | | F02B 29/0468 |
| | | | | 123/306 |
| 7,908,859 B2 | 3/2011 | Carlsson et al. | | |
| 8,453,626 B2 * | 6/2013 | Holm | | F02M 35/10177 |
| | | | | 123/568.18 |
| 8,459,017 B2 * | 6/2013 | Paterson | | B01F 3/02 |
| | | | | 138/38 |
| 8,720,195 B2 * | 5/2014 | Gardner | | F01N 3/05 |
| | | | | 60/289 |
| 8,800,276 B2 * | 8/2014 | Levin | | B01F 5/0268 |
| | | | | 261/79.2 |
| 9,243,550 B2 * | 1/2016 | Miazgowicz | | F02B 37/16 |
| 9,605,573 B2 * | 3/2017 | Solbrig | | F01N 3/106 |
| 9,670,881 B2 * | 6/2017 | Shioda | | F02M 26/09 |
| 9,683,528 B2 * | 6/2017 | Cho | | F02M 35/10268 |
| 9,726,064 B2 * | 8/2017 | Alano | | B01F 3/04021 |
| 2005/0172615 A1 * | 8/2005 | Mahr | | B01D 53/9431 |
| | | | | 60/286 |
| 2006/0075745 A1 * | 4/2006 | Cummings | | F01N 1/088 |
| | | | | 60/315 |
| 2007/0144170 A1 | 6/2007 | Griffith | | |
| 2007/0256413 A1 | 11/2007 | Marsal et al. | | |
| 2007/0266705 A1 * | 11/2007 | Wood | | F02B 37/22 |
| | | | | 60/599 |
| 2007/0271920 A1 * | 11/2007 | Marsal | | F02M 26/06 |
| | | | | 60/605.2 |
| 2008/0047260 A1 * | 2/2008 | Kapsos | | B01F 3/04049 |
| | | | | 60/286 |
| 2009/0019843 A1 * | 1/2009 | Levin | | B01F 3/04049 |
| | | | | 60/303 |
| 2009/0031968 A1 * | 2/2009 | Cracknell | | C01B 3/386 |
| | | | | 123/3 |
| 2009/0101123 A1 * | 4/2009 | Brogdon | | B01F 3/02 |
| | | | | 123/568.15 |
| 2011/0011084 A1 * | 1/2011 | Yanagida | | F02M 35/084 |
| | | | | 60/605.2 |
| 2011/0030372 A1 | 2/2011 | Ooshima et al. | | |
| 2011/0041495 A1 * | 2/2011 | Yager | | F02B 29/0437 |
| | | | | 60/605.2 |
| 2011/0048003 A1 | 3/2011 | Chen | | |
| 2011/0162360 A1 | 7/2011 | Vaught et al. | | |
| 2012/0014843 A1 * | 1/2012 | Birkby | | F01N 3/035 |
| | | | | 422/180 |
| 2012/0017666 A1 * | 1/2012 | Otsuki | | G01N 33/0026 |
| | | | | 73/23.33 |
| 2013/0269325 A1 * | 10/2013 | Hadden | | B01F 5/0689 |
| | | | | 60/297 |
| 2013/0333363 A1 * | 12/2013 | Joshi | | F01N 3/208 |
| | | | | 60/301 |
| 2014/0020382 A1 * | 1/2014 | Subramanian | | F02B 29/0406 |
| | | | | 60/605.2 |
| 2014/0165974 A1 * | 6/2014 | Mahakul | | F02M 25/0715 |
| | | | | 123/568.11 |
| 2014/0318112 A1 * | 10/2014 | Solbrig | | F01N 3/208 |
| | | | | 60/324 |
| 2014/0366852 A1 * | 12/2014 | Liening | | F02M 25/0722 |
| | | | | 123/568.11 |
| 2015/0047618 A1 * | 2/2015 | Ulrey | | F02D 41/0065 |
| | | | | 123/568.12 |
| 2015/0059319 A1 * | 3/2015 | Shiva | | F01N 3/2066 |
| | | | | 60/295 |
| 2015/0121851 A1 * | 5/2015 | Dane | | F02D 21/08 |
| | | | | 60/274 |
| 2015/0265978 A1 * | 9/2015 | Barciela | | B01F 3/02 |
| | | | | 123/568.17 |
| 2015/0267650 A1 * | 9/2015 | Siuchta | | F02M 21/0215 |
| | | | | 60/605.2 |
| 2015/0285192 A1 * | 10/2015 | Roth | | F02M 26/04 |
| | | | | 60/605.2 |
| 2015/0300297 A1 * | 10/2015 | LaPointe | | F02M 27/02 |
| | | | | 60/605.2 |
| 2015/0322838 A1 * | 11/2015 | Qi | | F01N 9/00 |
| | | | | 60/276 |
| 2016/0160804 A1 * | 6/2016 | Dettloff | | F02M 26/19 |
| | | | | 123/568.17 |
| 2016/0177880 A1 * | 6/2016 | Hartzler | | F02M 35/10222 |
| | | | | 123/568.12 |
| 2016/0215673 A1 * | 7/2016 | Noren, IV | | F01N 3/2892 |
| 2016/0230656 A1 * | 8/2016 | Emmerson | | F02C 3/14 |
| 2016/0332126 A1 * | 11/2016 | Nande | | B01F 5/0268 |
| 2017/0022870 A1 * | 1/2017 | Chapman | | F01N 3/28 |
| 2017/0044956 A1 * | 2/2017 | Zhang | | F01N 3/2892 |
| 2017/0107877 A1 * | 4/2017 | Johnson | | F01N 3/2066 |
| 2017/0136410 A1 * | 5/2017 | Zhang | | B01D 53/9431 |

FOREIGN PATENT DOCUMENTS

| | | |
|---|---|---|
| GB | 2320057 A | 6/1998 |
| JP | 5828583 A | 2/1983 |
| JP | 59194047 A | 11/1984 |

* cited by examiner

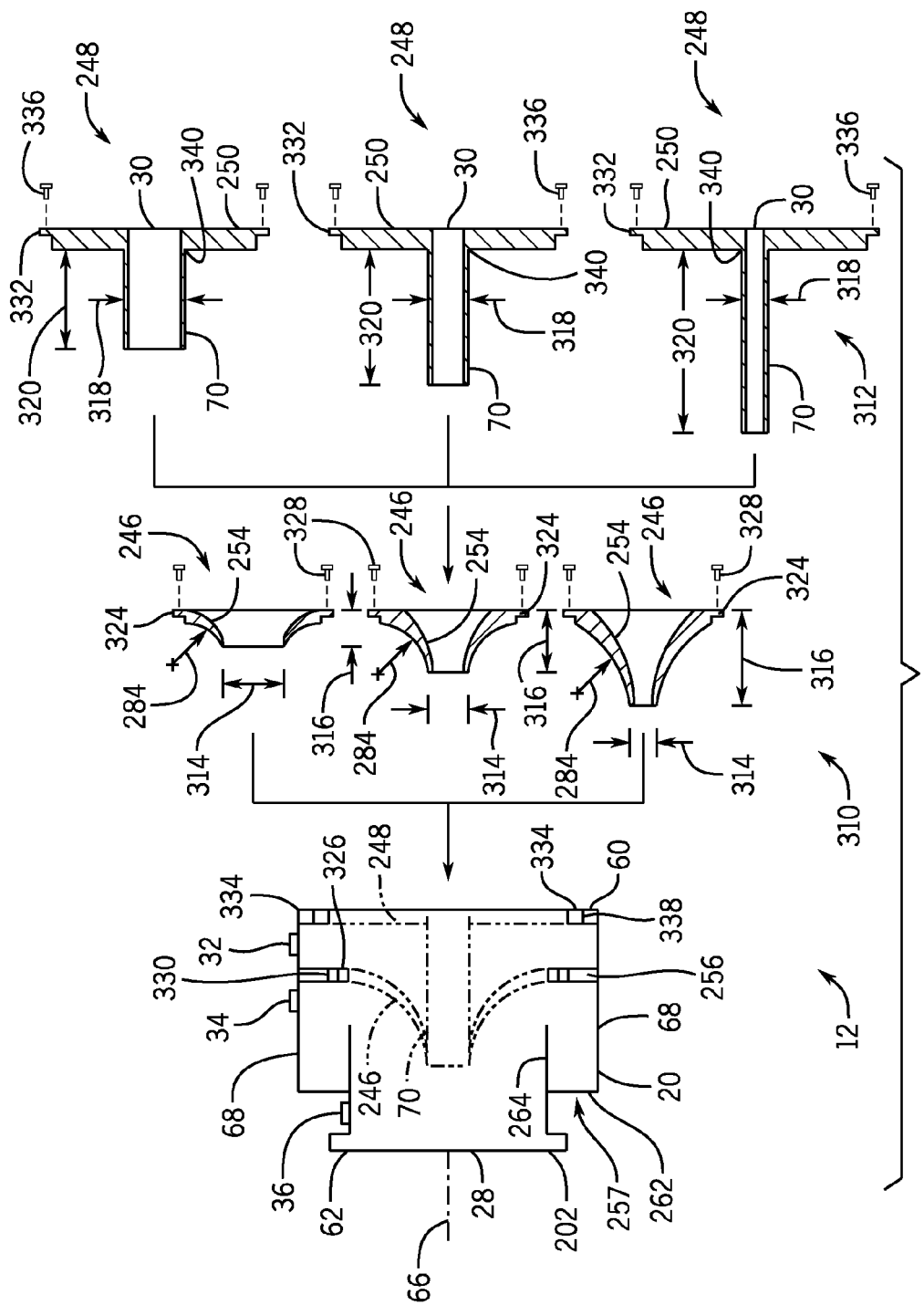

SYSTEM AND METHOD OF EXHAUST GAS RECIRCULATION

STATEMENT REGARDING FEDERALLY SPONSORED RESEARCH & DEVELOPMENT

The U.S. Government has a paid-up license in this invention and the right in limited circumstances to require the patent owner to license others on reasonable terms as provided for by the terms of DE-FC26-01CH11080 awarded by the Department of Energy.

BACKGROUND OF THE INVENTION

The disclosed subject matter relates to exhaust gas recirculation (EGR) for combustion engines.

A combustion engine, such as a reciprocating internal combustion engine, generates exhaust has having a variety of pollutants, such as nitrogen oxides (NOx). An EGR system may be used to recirculate a portion of the exhaust gas back into the combustion chambers (e.g., engine cylinders) to help reduce the formation of NOx. In particular, the exhaust gas serves as a diluent to help reduce the peak firing temperatures in the combustion chambers, thereby reducing the formation of NOx. Unfortunately, the EGR system may cause the formation of water droplets, which can reduce the life of the EGR equipment or the combustion engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an exhaust gas recirculation (EGR) mixer which includes a housing and a first passage in the housing. The first passage may be configured to supply an EGR flow into the housing. The system includes a second passage in the housing, such that the second passage is disposed about the first passage. The second passage is configured to supply at least one fluid flow into the housing. The system also includes a region downstream from the first and second passages where the region receives the EGR flow and the at least one fluid flow at substantially equal velocities, and a fluid outlet downstream from the region.

In a second embodiment, a system includes an exhaust gas recirculation (EGR) mixer which includes a housing and an EGR conduit protruding into the housing. The EGR conduit is configured to supply an EGR flow into the housing, and a turning wall disposed about the EGR conduit. A first chamber is disposed about the EGR conduit upstream of the turning wall and includes a first fluid inlet into the first chamber. A second chamber is disposed about the EGR conduit downstream of the turning wall and includes a second fluid inlet into the second chamber. The system also includes a region in the housing downstream from the EGR conduit and the second chamber which is configured to receive the EGR flow and a fluid flow from the second chamber at substantially equal velocities. The system also includes a fluid outlet downstream of the EGR conduit, the first fluid inlet, and the second fluid inlet.

In a third embodiment, a method includes flowing an exhaust gas recirculation (EGR) flow through a first passage into a housing of an EGR mixer, flowing at least one fluid flow through a second passage into the housing of the EGR mixer, such that the second passage is disposed about the first passage. The method also includes receiving the EGR flow and the at least one fluid flow at substantially equal velocities in a region downstream from the first and second passages and outputting a mixture through a fluid outlet downstream from the region.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 10 is an exploded schematic cross-sectional view of a mixer, illustrating a family of removable flow guides (e.g., turning wall inserts) and a family of removable end assemblies with central conduits.

DETAILED DESCRIPTION OF THE INVENTION

Figure 1:
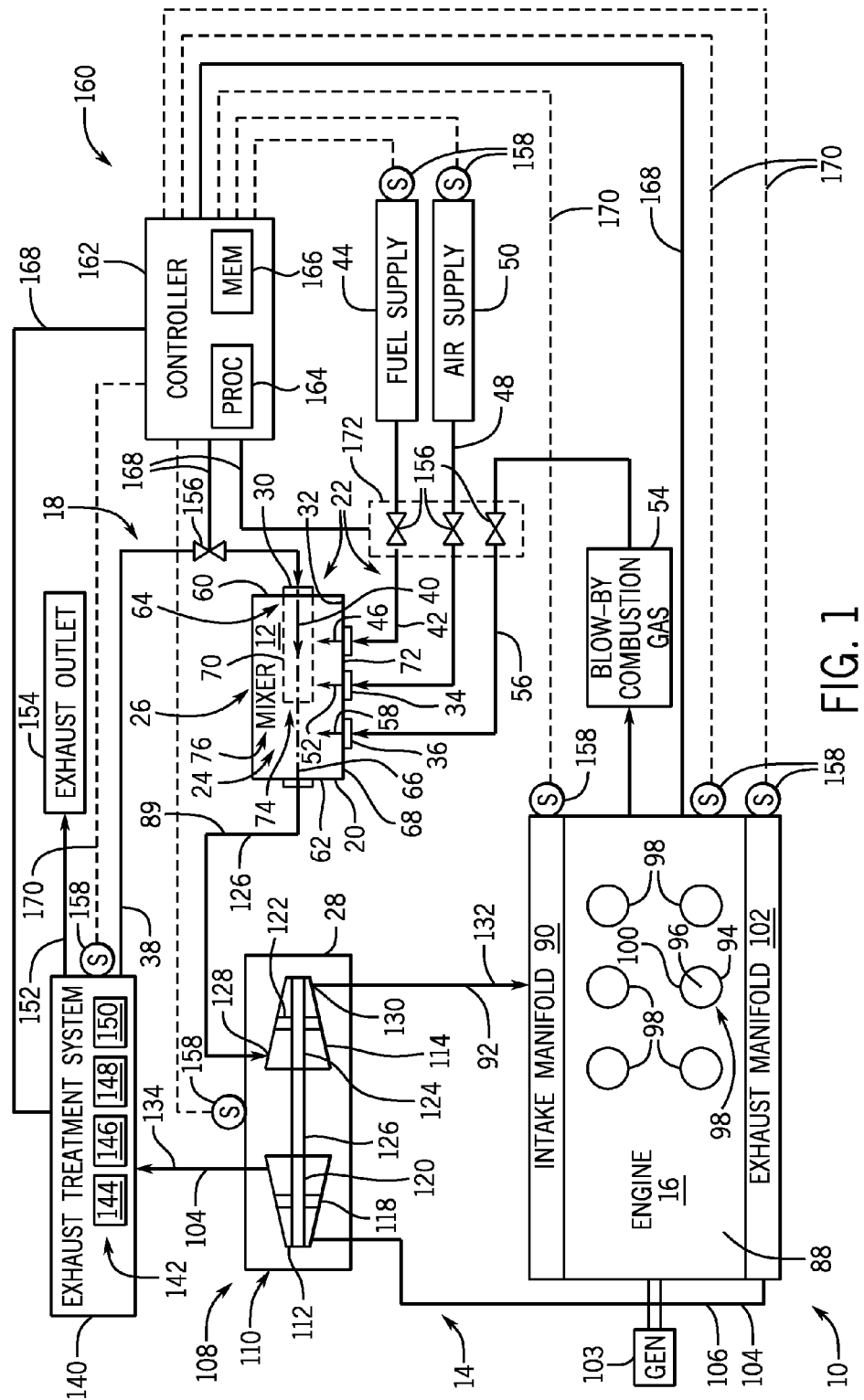
FIG. 1 is a diagram of an embodiment of an engine-driven system having a mixer disposed in an exhaust gas recirculation (EGR) system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, embodiments of an exhaust gas recirculation (EGR) mixer help to reduce mixing of exhaust gas with other fluids, such as oxidant (e.g., air), fuel, blow-by combustion gas, or other fluids, in an EGR system for an engine. For example, the EGR mixer may be disposed along an EGR flow path upstream from a compressor (e.g., a turbocharger) and an intake manifold of an engine (e.g., a reciprocating internal combustion engine). In particular, the EGR mixer may help to reduce mixing of the exhaust gas with one or more additional fluids prior to flowing between blades in the compressor, thereby helping to reduce any formation of water droplets upstream of the blades in the compressor.

The disclosed embodiments of the EGR mixer include a first passage through a conduit in a housing, a second passage between the conduit and the housing, a fluid inlet (e.g., exhaust gas inlet) into the first passage, one or more fluid inlets (e.g., air inlet, fuel inlet, blow-by combustion gas inlet, etc.) into the second passage, a low mixing region (e.g., low shear region with substantially equal velocities of flow) downstream of the first and second passages, and an outlet (e.g., a fluid outlet) downstream of the low mixing region. For example, the velocities of the fluid flows in the low mixing region may be within approximately plus or minus 5, 10, 15, 20, or 25 percent relative to one another. The first passage may be oriented in an axial direction toward the outlet, e.g., along a central longitudinal axis of the housing. The first and second passages may be coaxial or concentric, and may be aligned with an outlet axis of the fluid outlet. The second passage may include a turning wall (e.g., annular turning wall insert). The EGR mixer may include a first chamber extending around the conduit upstream of the turning wall, one or more baffles extending around the conduit downstream of the turning wall, and a second chamber extending around the baffles downstream of the turning wall. Each of the first and second chambers may have one or more fluid inlets (e.g., air inlet, fuel inlet, blow-by combustion gas inlet, etc.). The turning wall may distribute the fluid flow in a variety of flow passages, including one or more converging passages, diverging passages, and/or restricted passages, thereby contributing to reduced mixing of the flows of the first and second passages. The restricted passages may include axial restricted passages, radial restricted passages, or a combination thereof. For example, axial restricted passages may be disposed in a radial gap between the conduit and an edge or tip of the turning wall, and radial restricted passages may be disposed in an axial gap between the turning wall and the baffles. In some embodiments, the fluid flow path converges along a converging passage between the turning wall and the baffles.

The EGR system may control the flow of fluids (e.g., exhaust gas, fuel, oxidant such as air, and/or blow-by combustion gases) through the fluid inlets into the EGR mixer to control the ratio of these fluids, the reduction in the degree of mixing between the fluids of the first flow and the second flow, the distribution of fluids, and so forth. The turning wall, baffles, converging passages, diverging passages, and restricted passages also may help to reduce mixing of the fluids within the second passage. For example, the EGR system may provide a more uniform mixture of the fluids across a cross-sectional area of the housing within the second passage. The EGR system also may help to improve uniformity of flow (e.g., uniform velocity profile) of the EGR flow in the first passage and substantially equal velocities between the first and second passages, thereby helping to reduce the formation of water droplets. For example, the EGR system helps to reduce or minimize the velocity differential (or shear) between the first flow (e.g., EGR gas) from the first passage and the second flow (e.g., fuel, air, etc.) from the second passage to reduce mixing of the first and second flows, thereby reducing mixing-induced cooling of the first flow by the second flow (e.g., cooler fuel/air that chills the hotter EGR gas). In turn, the reduced mixing and cooling results in a reduced formation of water droplets to help protect equipment in the EGR system, including blades of the compressor (e.g., a turbocharger).

FIG. 1 is a diagram of an embodiment of an engine-driven system 10 having a mixer 12 disposed in an exhaust gas recirculation (EGR) system 14 of an engine 16. As discussed in further detail below, the mixer 12 may be configured to mix a plurality of fluids (e.g., exhaust, fuel, oxidant such as air, blow-by combustion gas, or any combination thereof) along an EGR path or loop 18 of the EGR system 14. For example, the mixer 12 may include a housing 20 having a plurality of inlets 22 into a chamber 24, a plurality of internal passages or conduits 26 within the chamber 24, and at least one outlet 28 (e.g., fluid outlet). The inlets 22 may include a first inlet or port 30, a second inlet or port 32, a third inlet or port 34, and a fourth inlet or port 36. The inlet 30 may be configured to receive a first fluid (e.g., exhaust gas or EGR gas) through a conduit or duct 38 (e.g., exhaust duct) coupled to the engine 16 as indicated by arrow 40. The inlet 32 may be configured to receive a fluid (e.g., fuel) through a conduit or duct 42 (e.g., fuel duct) coupled to a fuel supply 44 as indicated by arrow 46. The fuel may include liquid and/or gaseous fuel, such as natural gas, syngas, gasoline, diesel fuel, biofuel, or any combination thereof. The inlet 34 may be configured to receive a fluid (e.g., oxidant such as air) through a conduit or duct 48 (e.g., oxidant or air duct) coupled to an oxidant or air supply 50 as indicated by arrow 52. In the following discussion, any reference to air or oxidant is intended to include air, oxygen, oxygen-enriched air, or any combination thereof. The inlet 36 may be configured to receive a fluid (e.g., blow-by combustion gas 54) through a conduit or duct 56 (e.g., blow-by combustion gas duct) coupled to the engine 16 as indicated by arrow 58. Within the chamber 24, the mixer 12 is configured to mix the plurality of fluids (e.g., exhaust gas, fuel, air, and/or blow-by gas) received from the plurality of inlets 22, and subsequently discharge a fluid mixture through the outlet 28.

As illustrated, the mixer 12 may orient the plurality of inlets 22 in a crosswise orientation relative to one another. For example, the illustrated mixer 12 has the exhaust inlet 30 at a first axial end portion 60 of the housing 20, and orients the exhaust inlet 30 in a downstream direction through the chamber 24 toward an opposite second axial end portion 62. By further example, the exhaust inlet 30 may be positioned in a central region 64 of the first axial end portion 60, such as along an axial centerline or axis 66 of the housing 20. In contrast, the fluid inlets 32, 34, and 36 may be oriented along a circumferential outer wall or sidewall 68 that extends about the axis 66. For example, the fluid inlets 32, 34, and 36 may be oriented in a crosswise direction (e.g., radial direction) relative to the axis 66. The fluid inlets 32, 34, and 36 also be spaced apart from one another at different axial positions in the downstream direction along the axis 66. In certain embodiments, the housing 20 also includes the internal passages or conduits 26 within the housing 20, thereby reducing the mixing of fluids between a first conduit 70 and a second conduit 72. For example, the mixer 12 may include the first conduit 70 coupled to the inlet 30 (e.g., exhaust inlet) and the second conduit 72 coupled to or associated with at least part of the sidewall 68 and at least one or more of the inlets 32, 34, and 36. The first conduit 70 defines a passage 74, e.g., an exhaust passage. The second conduit 72 defines a passage 76. In the illustrated embodiment, the first and second conduits 70 and 72 and associated passages 74 and 76 maybe disposed one about another, e.g., in a coaxial or concentric arrangement relative to the axis 66. Again, the arrangement of inlets 22 and passages 26 may be configured to control the reduced mixing of exhaust gas, fuel, air, and/or blow-by gases (e.g., coaxial fluid 89), such as by controlling the order of entry of fluids, the distribution of the different fluids, etc. The EGR system 14 then routes the coaxial fluid 89 from the EGR mixer 12 through a forced induction system 108 to the engine 16. As described herein, coaxial fluid may be defined as separate fluids flowing from coaxial conduits (e.g., the first conduit 70, the second conduit 72) such that the flows from the first conduit 70 and the second conduit 72 remain substantially separate from one another.

As will be appreciated, the engine 16 may include a reciprocating internal combustion engine, such as a compression ignition engine (e.g., a diesel engine), a spark ignition engine, or other engine suitable for utilizing exhaust gas recirculation. As illustrated, the engine 16 includes an engine block 88 having an intake manifold 90, a plurality of cylinders 94 with respective reciprocating pistons 96 forming piston cylinder assemblies 98 having combustion chambers 100, and an exhaust manifold 102. The engine 16 draws an intake fluid 92 (e.g., charged air, coaxial fluid 89 from the EGR mixer 12, or a combination thereof) through the intake manifold 90 into the engine 16 to distribute the intake fluid 92 among the combustion chambers 100. The engine 16 may be a large-scale industrial reciprocating engine having 1 to 24 (e.g. 4, 6, 8, 10, 12, 16, 20, or 24) cylinders 94 and associated pistons 96 disposed within the engine 16. The engine 16 may operate as a two stroke cycle, a four stroke cycle, or another multi-stroke cycle. In certain embodiments, the cylinders 94 and/or the pistons 96 may have a diameter of between approximately 13.5-34 centimeters (cm). In some embodiments, the cylinders 94 and/or the pistons 96 may have a diameter of between approximately 10-50 cm, 15-30 cm, or 15-20 cm. In some embodiments, the cylinders 94 and/or the pistons 96 may have a diameter greater than approximately 10 cm, 15 cm, 20 cm, 25 cm, 30 cm, 35 cm, or 40 cm. The engine-driven system 10 may generate power ranging from 10 kilowatts (kW) to 10 Megawatts (MW). In some embodiments, the engine 16 may be configured to operate at a maximum revolutions per minute (RPM) of approximately 1800 RPM. In some embodiments, the engine 16 may be configured to operate at a maximum of approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 16 may operate between approximately 750-2000 RPM, 900-1800 RPM, or 1000-1600 RPM. Furthermore, in some embodiments, the piston 96 may have a generally low maximum mean piston speed (e.g., relative to automobile engines or the like). For example, the piston 96 may have a maximum mean piston speed of less than 25 meters per second (m/s), 20 m/s, 19 m/s, 18 m/s, 17 m/s, 16 m/s, 15 m/s, 14 m/s, 13 m/s, 12 m/s, 11 m/s, 10 m/s, 9 m/s, 8 m/s, 7 m/s, 6 m/s, or 5 m/s. In some embodiments, the piston 96 may have a maximum mean piston speed of between approximately 1 to 25 m/s, 5 to 20 m/s, 10 to 20 m/s, 10 to 16 m/s, 13 to 15 m/s, or 11 to 12 m/s. In some embodiments, the piston 96 may have a maximum mean piston speed of approximately 12 m/s. The mean piston speed is an average speed of the piston 96 in the engine 16 and is a function of stroke and RPM. For example, the mean piston speed (MPS) may be equal to $(2 \times S) \times (RPM/60)$, where S is the stroke (e.g., a length of the stroke) and RPM is the revolutions per minute at which the engine 16 operates. In the above equation, the stroke is multiplied by a factor of 2 to account for the fact that two strokes occur per one crank revolution, and the RPM may be divided by a factor of 60 to convert minutes to seconds. Exemplary engines 16 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The engine 16 combusts a mixture of fuel, air, and exhaust gas in each combustion chamber 100, thereby driving reciprocal motion of the piston 96 in the respective cylinder 94 to rotate a crankshaft coupled to a load 103 (e.g., an electrical generator). As appreciated, a small amount of the combustion gases (e.g., blow-by combustion gases 54) leak around the pistons 96 (e.g., the piston rings) and enter a crankcase of the engine 16. In illustrated embodiment, the blow-by combustion gas 54 may be collected from the engine 16 and redirected into the EGR mixer 12. The majority of the exhaust gas 104 discharges from the combustion chambers 100 through the exhaust manifold 102 into one or more exhaust systems, e.g., an exhaust conduit or duct 106, the forced induction system 108, an exhaust treatment system 140, and an exhaust outlet 154.

The forced induction system 108 is configured to charge (e.g., compress) the intake fluid 92 (e.g., air, exhaust gas, fuel, etc.) to help increase the efficiency of the engine 16. The illustrated forced induction system 108 includes a turbocharger 110 having a turbine 112 drivingly coupled to a compressor 114 via a shaft 116. The turbine 112 has one or more stages of a plurality of turbine blades 118 coupled to a rotor or shaft 120. The compressor 114 has one or more stages of a plurality of compressor blades 122 coupled to a rotor or shaft 124. As the exhaust gas 104 flows through the turbine 112, the exhaust gas 104 drives rotation of the turbine blades 118 and shaft 120, thereby driving rotation of the shaft 116 coupled to the compressor 114. As a result, the compressor 114 is driven to rotate the compressor blades 122, thereby compressing the coaxial fluid 89 flowing from the outlet 28 of the EGR mixer 12 through a conduit 126 into an inlet 128 of the compressor 114. The compressor 114 then discharges a charged fluid (e.g., compressed coaxial fluid 89) through an outlet 130, which is coupled to a conduit 132 leading to the intake manifold 90 of the engine 16. Again, the EGR mixer 12 is configured to help reduce mixing of exhaust gas, air, fuel, blow-by combustion gas, or other fluids, or any combination thereof, while also helping to reduce formation of water droplets upstream of the compressor 114 and the engine 16. The charged fluid (e.g., compressed coaxial fluid 89) serves at least partially or entirely as the intake fluid 92 into the engine 16.

After the exhaust gas 104 passes through the turbine 120, the forced induction system 108 outputs the spent exhaust gas 104 to the exhaust treatment system 140 through a conduit 134. In certain embodiments, the exhaust treatment system 140 may include a plurality of treatment units 142, such as a filter unit 144, a catalytic convert unit 146, a fluid injection unit 148 (e.g., chemical injection unit), and an absorption unit 150. The exhaust treatment system 140 may then output a treated exhaust gas 152. A portion of the treated exhaust gas 152 may be discharged into the atmosphere through the exhaust outlet 154. Another portion of the treated exhaust gas 152 may be used in the EGR system 14, and thus may be routed to the EGR mixer 12. In certain embodiments, the EGR mixer 12 may receive the treated exhaust gas 152, untreated exhaust gas 104 from the turbine 112, untreated exhaust gas 104 from the engine 16, or any other source of exhaust gas 104 with or without passing through various equipment. In the illustrated embodiment, a portion of the treated exhaust gas 152 passes through the conduit 38 from the exhaust treatment system 142 to the inlet 30 of the EGR mixer 12. Thus, the EGR loop 18 of the EGR system 14 may include the engine 16, the conduit 106, the turbine 112 of the forced induction system 108, the conduit 134, the exhaust treatment system 140, the conduit 38, the EGR mixer 12, the conduit 126, the compressor 114 of the forced induction system 108, and the conduit 132 back to the engine 16.

The engine-driven system 10 also includes a control system 160 coupled to the engine 16, the EGR mixer 12, the forced induction system 108, the exhaust treatment system 140, a plurality of valves 156 (e.g., actuator-driven valves), and a plurality of sensors 158 via a plurality of control lines 168 (e.g., data communication lines, hydraulic control lines, pneumatic control lines, etc.) and monitoring lines 170 (e.g., data communication lines). The control system 160 includes one or more controllers 162 having one or more processors 164 and memory 166, wherein the memory 166 stores computer-readable code or instructions executable by the processor 164 to monitor and control operation of the engine-driven system 10. For example, the control system 160 may be communicatively coupled to actuator-driven valves 156 (e.g., exhaust valve, fuel valve, air valve, and blow-by gas valve) disposed along the conduits 38, 42, 48, and 56 to the inlets 30, 32, 34, and 36 of the EGR mixer 12, thereby enabling the controller 162 to control the distribution, ratio, and flows of exhaust gas, fuel, air, and blow-by combustion gas into the EGR mixer 12. In certain embodiments, the EGR system 14 may include one or more fluid manifolds, distributors, and/or valve assemblies 172, such as for the conduits 38, 42, 48, and 56 associated with the inlets 30, 32, 34, and 36 into the EGR mixer 12. Thus, the controller 162 may cooperatively control the flows through conduits 38, 42, 48, and 56 via control of the valve assembly 172. By further example, the control system 160 may be communicatively coupled to a pump, a compressor, a flow meter, a pressure regulator, an actuator, or any combination thereof, in the fuel supply 44 and the air supply 50. The control system 160 may be configured to operate the engine 16 with a fuel-rich air/fuel ratio, a fuel-lean air/fuel ratio, or a stoichiometric air/fuel ratio. The control system 160 also may be configured to control the amount of EGR flow (e.g., exhaust gas) recirculated through the EGR mixer 12 to reduce the peak firing temperature below a threshold temperature, reduce exhaust emissions (e.g., NOx emissions) below a threshold level, or a combination thereof.

In order to monitor and control the engine-driven system 10, the control system 160 may be communicatively coupled to sensors 158 in, on, or associated with the engine 16, the conduit 106, the turbine 112 of the forced induction system 108, the conduit 134, the exhaust treatment system 140, the conduit 38, the EGR mixer 12, the conduit 126, the compressor 114 of the forced induction system 108, the conduit 132 back to the engine 16, the intake manifold 90, the exhaust manifold 102, the exhaust conduit 152, the conduits 42, 48, and 56, the fuel supply 44, the air supply 50, or any combination thereof. Accordingly, the sensors 158 may include exhaust treatment sensors, intake manifold sensors, exhaust manifold sensors, engine sensors, fuel supply sensor, air supply sensor, compressor sensors, turbine sensors, EGR mixer sensors, exhaust sensors, fluid intake sensors (e.g., air, fuel, etc.), or any combination thereof. For example, the sensors 158 may include pressure sensors, temperature sensors, flow rate sensors, fluid composition sensors, speed sensors, vibration sensors, moisture sensors (e.g., moisture upstream, in, or downstream of EGR mixer 12), or any combination thereof. The fluid composition sensors 158 may include exhaust emissions sensors, oxygen sensors, fuel sensors, NOx sensors, carbon monoxide (CO) sensors, or any combination thereof. Using feedback from the various sensors 158, the controller 162 may control the distribution, ratio, and flows of exhaust gas, fuel, air, and blow-by combustion gas into the EGR mixer 12, thereby helping to reduce formation of moisture, reduce exhaust emissions (e.g., NOx), and improve engine performance.

Figure 2:
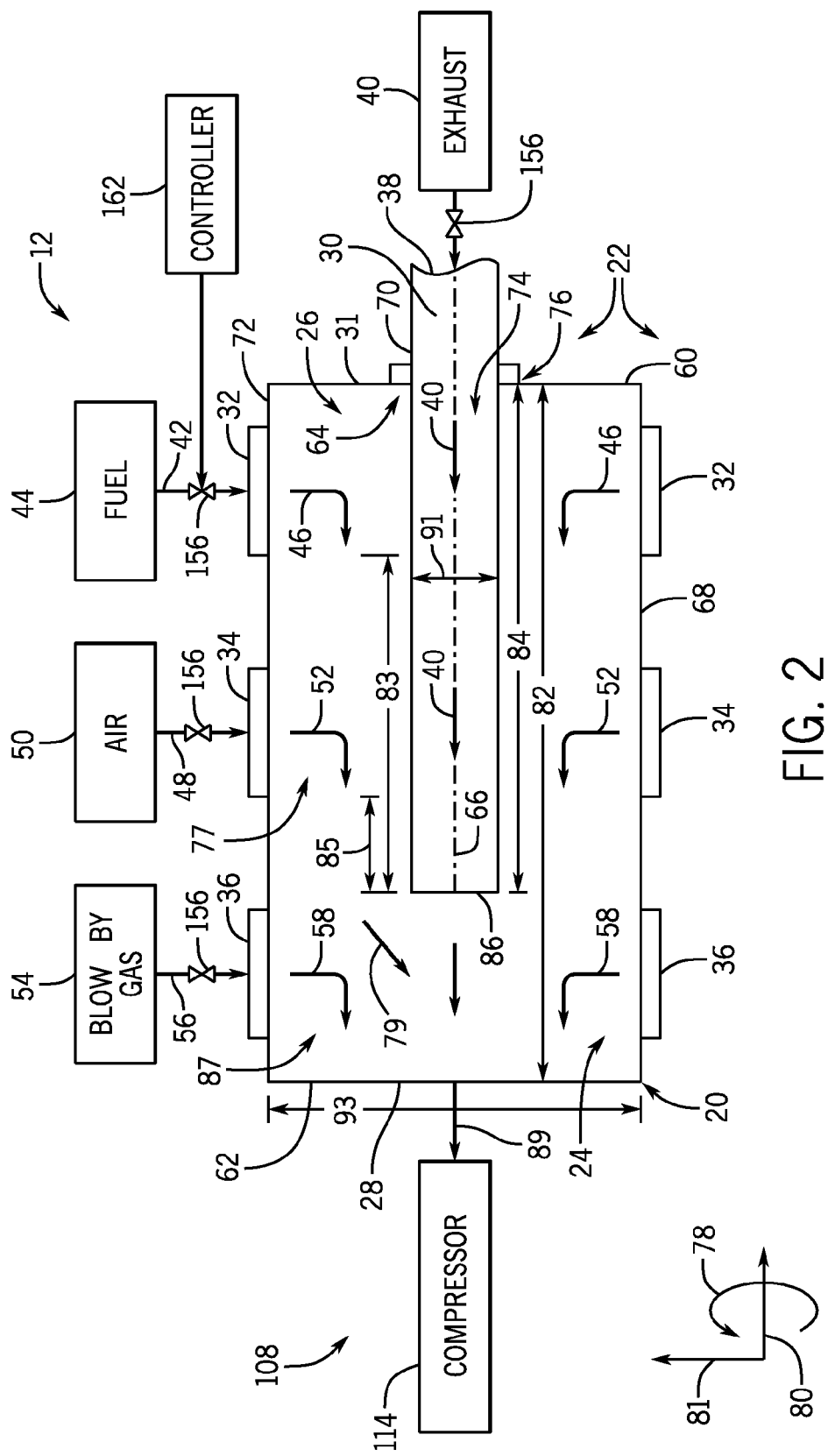
FIG. 2 is a schematic cross-sectional view of an embodiment of a mixer coupled to a compressor of the EGR system.

FIG. 2 is a schematic cross-sectional view of an embodiment of a mixer 12 coupled to the compressor 114 of the forced induction system 108 in the EGR system 14. As illustrated, the mixer 12 has the housing 20 disposed about the first conduit 70 coupled to the inlet 30 (e.g., exhaust inlet) and the second conduit 72 coupled to or associated with at least part of the sidewall 68 and at least one or more of the inlets 32, 34, and 36. The conduits 26 (e.g., first and second conduits 70 and 72) are disposed between the first axial end portion 60 and the second axial end portion 62 of the housing 20, and may be coaxial or concentric with one another about the axis 66. The first and second conduits 70 and 72 may be annular conduits, rectangular conduits, polygonal conduits, hexagonal conduits, or any combination thereof.

The first conduit 70 defines the first passage 74 in the housing 20 that supplies an EGR flow 40 from the exhaust duct 38 into the chamber 24. The first conduit 70 may be coupled to or integrally formed with the central region 64 of the first axial end portion 60 of the mixer 12, and may protrude axially 80 into the chamber 24 along the axis 66 (e.g., coaxial or parallel at an offset) over less than the housing length 82 of the housing 20. For example, a conduit length 84 of the first conduit 70 may be 0 to 95, 5 to 90, 10 to 80, 15 to 70, 20 to 60, or 25 to 50 percent of the entire housing length 82 between the first and second axial end portions 60 and 62. The first conduit 70 terminates at a distal end having an exhaust injection port or outlet 86, which is disposed axially between the end portions 60 and 62. The difference between the lengths 82 and 84 reduces or minimizes mixing of the fluid flows downstream of the exhaust outlet 86 in the first conduit 70. The first conduit 70 also may have a diameter 91 that is between 1 to 50, 5 to 40, or 10 to 25 percent of a diameter of the second conduit 72 (e.g., sidewall 68 of housing 20). For example, the diameter 91 may be less than approximately 5, 10, 15, 20, or 25 percent of the diameter 93.

In some embodiments, the first conduit 70 having the first passage 74 and the outlet 86 is oriented axially 80 toward the outlet 28 at the second axial end portion 62 of the housing 20 of the mixer 12, such that axes 66 of the first conduit 70, the outlet 86, and the outlet 28 may be aligned with one another (e.g., coaxial). In this manner, the EGR flow 40 from the first conduit 70 may be centrally located to form a coaxial fluid flow 89 exiting the mixer 12 and entering the compressor 114, thereby helping to reduce the possibility of droplet formation further away from the axis 66 in the vicinity of compressor blades 122 in the compressor 114. In other words, if any water droplets form in the EGR flow 40 due to cooling caused by the flows (e.g., fuel, air, and/or blow-by gas) from the inlets 32, 34, and 36, then the water droplets would be centrally located closer to the axis 66, such that the water droplets would flow into a low tangential velocity region at a central portion (e.g., central hub or rotor 124) of the compressor 114. As a result, the centrally located EGR flow 40 associated with the first conduit 70 helps to protect the compressor blades 122 in the compressor 114.

The second conduit 72 defines the second passage 76 in the housing 20 that supplies one or more of a fuel flow 46, an air flow 52, and a blow-by combustion gas flow 58 into the mixer 12 via the fuel inlet 32, the air inlet 34, and the blow-by gas inlet 36, which in turn couple to the fuel conduit 42, the air conduit 48, and the blow-by conduit 56. The inlets 22 (e.g., 32, 34, and 36) may be disposed circumferentially 78 around the axis 66 of the mixer 12 and/or axially 80 along the axis 66 of the mixer 12 to introduce the fluids to the second passage 76. Given the locations in the sidewall 68, the inlets 22 (e.g., 32, 34, and 36) generally extend crosswise (e.g., radial direction 81) relative to the axis 66 into the second passage 76 of the mixer 12. In some embodiments, one or more of the inlets 22 (e.g., 32, 34, and 36) may be disposed in the axial end portion 60, such that the inlets 22 are oriented axially 80 into the second passage 76 of the mixer 12. Each of the inlets 32, 34, 36, and 38 may represent a single inlet or a plurality of inlets (e.g., 1 to 100 inlets), such as a plurality of inlets spaced circumferentially 78 about the axis 66, a single annular inlet defined by a manifold extending circumferentially 78 about the axis 66, a single inlet disposed at one circumferential 78 position about the axis 66, or any combination thereof. In certain embodiments, at least some or all of the inlets 32, 34, and 36 are disposed along the conduit length 84 of the first conduit 70 upstream from the outlet 86, such that at least some or all of the fuel flow 46, the air flow 52, and the blow-by combustion gas flow 58 are able to combine in a first region 77 to generate a combined fluid 79 prior to entering a second region 87 downstream from the outlet 86. In the illustrated embodiment, the fuel and air inlets 32 and 34 are disposed along the conduit length 84 upstream of the outlet 86, while the blow-by gas inlet 36 is disposed downstream of the outlet 86. In other embodiments, the inlets 32 and 36, the inlets 34 and 36, or the inlets 32, 34, and 36 may be disposed along the conduit length 84 upstream of the outlet 86 to facilitate combining of the flows in the first region 77.

The inlets 32, 34, and 36 may be arranged in any suitable sequence relative to the direction of exhaust flow through the mixer 12. For example, the blow-by gas inlet 36 may be disposed upstream, downstream, or between the fuel and air inlets 32 and 34. By further example, the air inlet 34 may be disposed upstream, downstream, or between the fuel and blow-by gas inlets 32 and 36. By further example, the fuel inlet 32 may be disposed upstream, downstream, or between the air and blow-by gas inlets 34 and 36. However, in the illustrated embodiment, the air inlet 34 is disposed downstream of the fuel inlet 32, and the blow-by gas inlet 36 is disposed downstream of the fuel and air inlets 32 and 34. The fuel and air inlets 32 and 34 may be disposed at respective offset distances 83 and 85 relative to the outlet 86 of the first conduit 70. These offset distances 83 and 85 and the conduit length 84 may be adjusted to control velocities of the fluids in the first and second regions 77 and 87. In addition, as discussed in detail below, one or more baffles, turning vanes, and/or flow guides may be disposed adjacent and/or between the inlets 32, 34, and 36 to help control the flow paths of the fuel flow 46, the air flow 52, and the blow-by combustion gas flow 58 in the first and second regions 77 and 87.

The EGR system 14 may control the flows, distribution, and ratios of the fuel flow 46, the air flow 52, and the blow-by gas flow 58 into the inlets 32, 34, and 36 via passive flow control and/or active flow control (e.g., controlling valves 156 with controller 162). For example, the passive flow control may use different numbers, shapes, and/or sizes (e.g., cross-sectional areas) of the inlets 32, 34, and 36, different flow restrictions via baffles, or any combination thereof. In certain embodiments, the passive flow control may be used to set a baseline ratio of the flows 46, 52, and 58, such as a fuel-lean fuel/air ratio, a fuel-rich fuel/air ratio, or a stoichiometric fuel/air ratio. The baseline ratio may be set at a steady state condition of the engine 16, a normal load of the generator 103 on the engine 16, or some other baseline operational condition. The controller 162 may then control the valves 156 to vary the ratio of the flows 46, 52, and 58 depending on feedback from the sensors 158 and/or control modes (e.g., engine performance mode, fuel efficiency mode, low emissions mode, start-up mode, steady state mode) stored in the memory 166 and executable by the processor 164 of the controller 162. The mixer 12 (e.g., via passive and active flow control) may also control the pressure and velocity of the flows 46, 52, and 58 to control the velocity profile in the first and second regions 77 and 87 of the mixer 12, such that the coaxial fluid 89 has a substantially reduced degree of mixing between the flows of the first and second conduits 70, 72 and a uniform velocity profile prior to exiting the mixer 12 through the outlet 28 and entering the compressor 114. For example, the mixer 12 may help to provide a more uniform velocity profile across the second region 87 and the coaxial fluid 89 such that the flows from the first and second conduits 70 and 72 have substantially uniform velocities.

Figure 3:
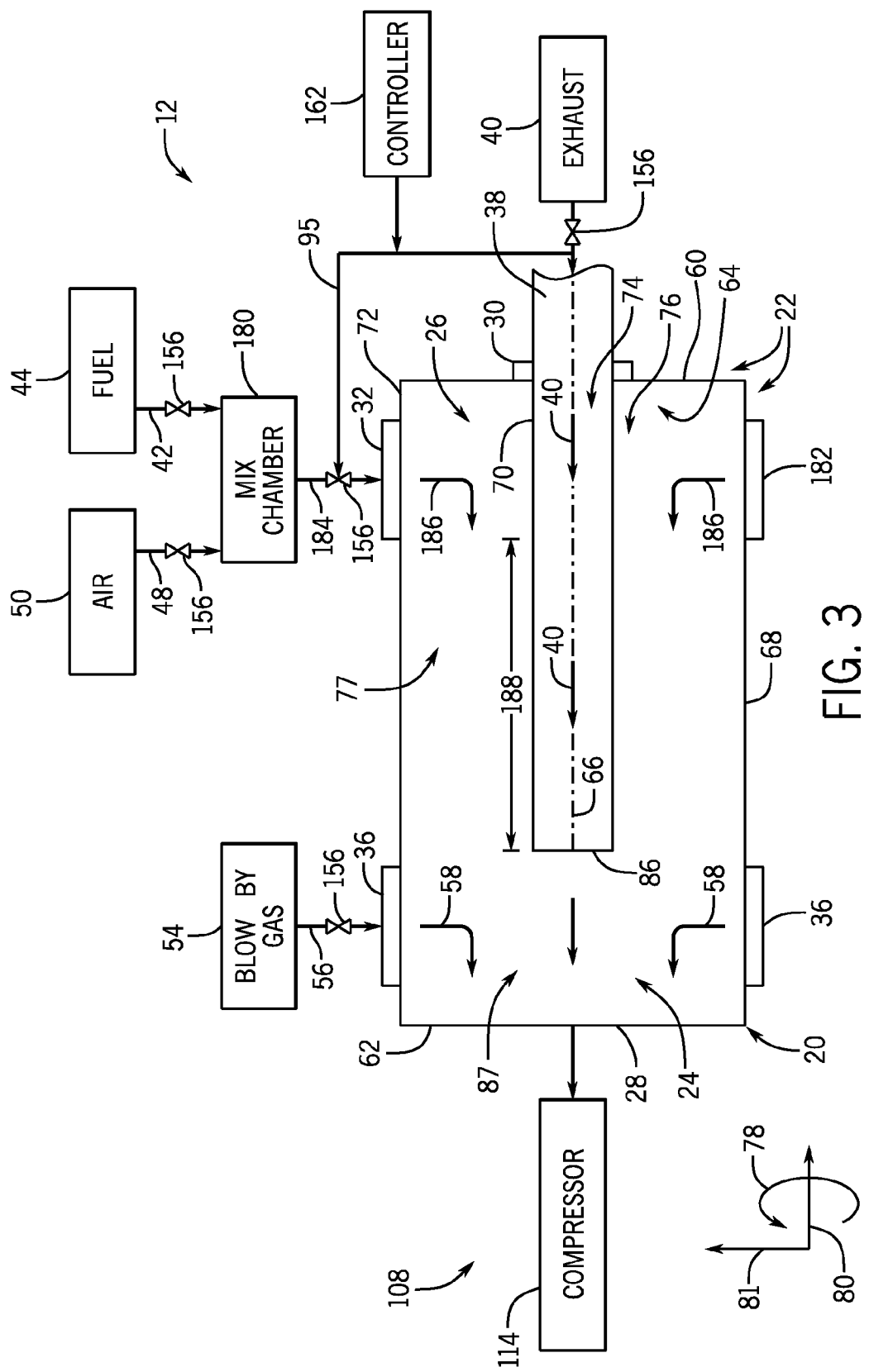
FIG. 3 is a schematic cross-sectional view of an embodiment of a mixer coupled to a compressor of the EGR system.

FIG. 3 is a schematic cross-sectional view of an embodiment of a mixer 12 coupled to the compressor 114 of the forced induction system 108 in the EGR system 14. In the illustrated embodiment, the EGR system 14 includes an external mixing chamber 180 (e.g., formed by a fluid mixing container or housing) configured to premix two or more fluids (e.g., air and fuel) upstream of the mixer 12. In certain embodiments, the EGR system 14 may include a plurality of external (e.g., upstream) mixing chambers 180 and associated inlets 182, such that a plurality of different fluids may be premixed prior to entry into the mixer 12. Each external mixing chamber 180 may be used to premix any fluids, such as fuel and air, fuel and blow-by gas, air and blow-by gas, different fuels, fuel and additives, or any combination thereof. The external (e.g., upstream) mixing chamber 180 may be separate from the mixer 12, removably coupled to the mixer 12, or integrally formed with the mixer 12 (e.g., formed as one-piece with the housing 20). For example, the external (e.g., upstream) mixing chamber 180 may be an annular mixing chamber (e.g., annular housing) extending around the sidewall 68 of the mixer 12. The illustrated external mixing chamber 180 is coupled to the fuel and air supplies 44 and 50 via conduits 42 and 56, which may include valves 156 coupled to the controller 162. Thus, the controller 162 may selectively adjust the valves 156 to control the ratio of fuel and air flows 46 and 52 into the mixing chamber 180. The external mixing chamber 180 is coupled to one or more combined fluid inlets 182 (e.g., 1 to 100) in the mixer 12 via a conduit or duct 184, which may also include a valve 156 coupled to the controller 162 to adjust the flow of a combined fluid flow 186 (e.g., air and fuel) into the mixer 12. The combined fluid flow 186 is directed into the second conduit 72 and remains substantially separate from the fluid flow in the first conduit 70.

Similar to the embodiments of FIGS. 1 and 2, the mixer 12 includes the first conduit 70 with the first passage 74 to supply the EGR flow 40 into the chamber 24 (e.g., second region 87) of the mixer 12, and the mixer 12 includes the inlet 36 to supply the blow-by gas flow 58 into the chamber 24 (e.g., second region 87) of the mixer 12. In the illustrated embodiment, the combined fluid inlet 182 may be disposed at an offset distance 188 upstream from the outlet 86 of the first conduit 70, while the blow-by gas inlet 36 may be disposed downstream of the outlet 86. This offset distance 188 and the conduit length 84 may be adjusted to control flows in the first and second regions 77 and 87. In addition, as discussed in detail below, one or more baffles, turning vanes, and/or flow guides may be disposed adjacent and/or between the inlets 36 and 182 to help control the flow paths of the flows 40, 58, and 186. In some embodiments, the blow-by gas inlet 36 may be disposed upstream of the combined fluid inlet 182, along the first conduit 70, or both. Furthermore, the combined fluid inlets 182 may have an equal, greater, or lesser number, shape, and/or size (e.g., cross-sectional area) relative to the blow-by gas inlets 36. Similar to the embodiments described above, the controller 162 may be coupled to the valves 156 and the sensors 158 to control the flows 40, 58, and 182 in the mixer 12.

Figure 4:
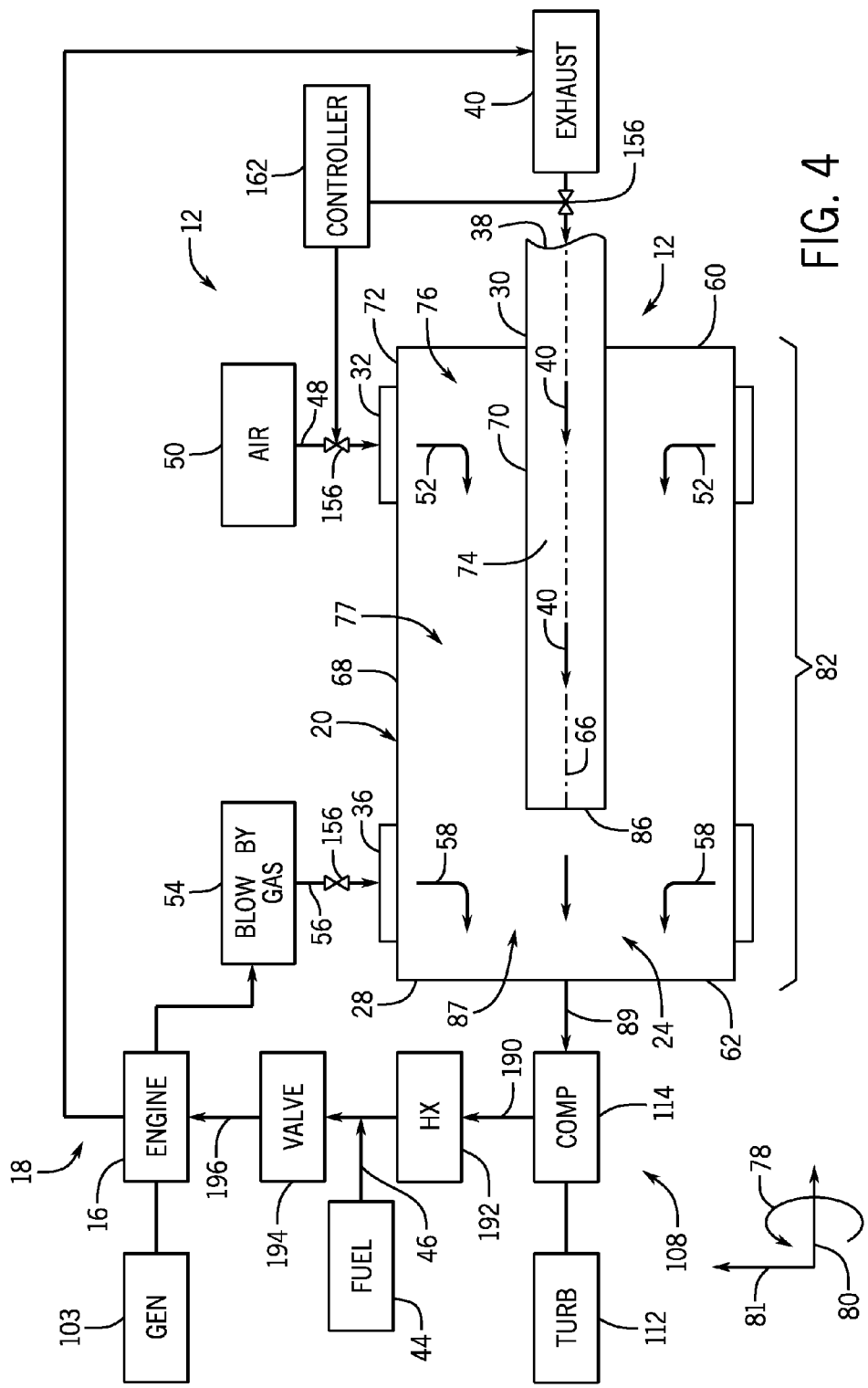
FIG. 4 is a diagram of an embodiment of an engine-driven system having a mixer disposed in an exhaust gas recirculation (EGR) system.

FIG. 4 is a diagram of an embodiment of an engine-driven system 10 having a mixer 12 disposed in an EGR system 14. In the illustrated embodiment, the mixer 12 is configured to combine the air flow 52 and the blow-by gas flow 58, while the fuel flow 46 is introduced downstream of the mixer 12. The air supply 50 is coupled to one or more air inlets 32 via conduit 48 at one or more positions along the first conduit 70, while the blow-by gas supply 54 is coupled to one or more blow-by gas inlets 36 at one or more positions downstream of the outlet 86 of the first conduit 70. In certain embodiments, the air inlets 32 may be disposed upstream, downstream, and/or at a same position as the blow-by gas inlets 36. In addition, one or both of the air and blow-by gas inlets 36 may be disposed along the first conduit 70 and/or downstream of the outlet 86 of the first conduit 70. In the second region 87, the air flow 52, the blow-by gas flow 58, and the EGR flow 40 remain substantially separated to create the coaxial fluid 89, which then exits the mixer 12 through outlet 28 and enters the compressor 114. As discussed in detail below, one or more baffles, turning vanes, and/or flow guides may be disposed adjacent and/or between the inlets 32 and 36 to help control the flow paths of the flows 40, 52, and 58. In some embodiments, the air inlets 32 may have an equal, greater, or lesser number, shape, and/or size (e.g., cross-sectional area) relative to the blow-by gas inlets 36. Similar to the embodiments described above, the controller 162 may be coupled to the valves 156 and the sensors 158 to control the flows 40, 52, and 58 in the mixer 12.

In some embodiments, the fuel supply 44 is coupled to the EGR system 14 separately from the mixer 12, such that the fuel flow 46 is not introduced directly into the mixer 12. Instead, in the illustrated embodiment, the fuel supply 44 is coupled to the EGR loop 18 downstream of the mixer 12 between the forced induction system 108 (e.g., compressor 14) and the engine 16. For example, the EGR loop 18 may include a conduit 190 (or series of conduits) coupling together the mixer 12, the compressor 114, a heat exchanger 192, a valve 194, and the engine 16. The compressor 114 is configured to compress the coaxial fluid 89 (e.g., EGR gas, air, and blow-by gas), which is directed to the compressor to remain substantially separated from the flow of the first region to reduce droplet formation in a central region entering the compressor 114. The compressed coaxial fluid 89 discharged from the compressor 114 may then flow through the heat exchanger 192, which may be configured to control a temperature (e.g., heat and/or cool) the compressed coaxial fluid 89. For example, the heat exchanger 192 may transfer heat from the compressed coaxial fluid 89 to a heat exchange fluid, such as water, air, refrigerant, or a coolant, thereby cooling the compressed coaxial fluid 89. By further example, the heat exchanger 192 may transfer heat from the heat exchange fluid to the compressed coaxial fluid 89, thereby heating the compressed coaxial fluid 89. The fuel supply 44 may be coupled to the conduit 190 downstream of the mixer 12, the compressor 114, and/or the heat exchanger 192, thereby enabling injection of the fuel flow 46 into the coaxial fluid 89 for mixing upstream of the engine 16. In certain embodiments, the conduit 190 may include a mixing chamber, a Venturi section, a fuel injector, a fuel injection manifold, or a combination thereof, to facilitate mixing of the fuel flow 46 with the coaxial fluid 89. The valve 194 is configured to control a flow of a fluid 196 (e.g., EGR gas, air, blow-by gas, and fuel) through the conduit 190 downstream of the fuel supply 44. The engine 16 then combusts the fluid 196, and generates more exhaust gas for the EGR loop 18 and more blow-by combustion gas 54 for the mixer 12.

Figure 5:
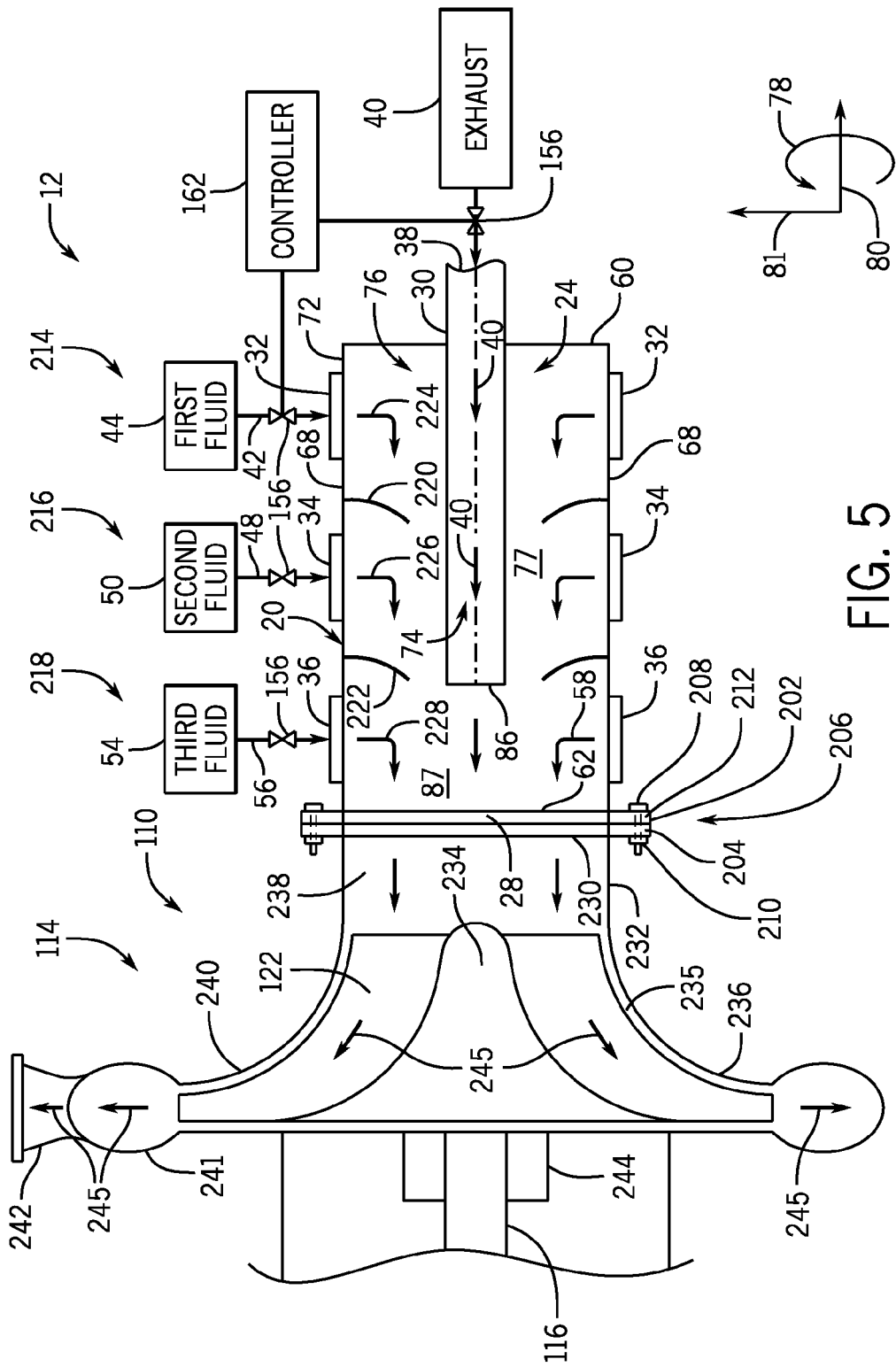
FIG. 5 is a schematic cross-sectional view of a mixer coupled to a compressor of the EGR system.

FIG. 5 is a schematic cross-sectional view of an embodiment of a mixer 12 coupled to a compressor 114 of the forced induction system 108 in the EGR system 14. In the illustrated embodiment, the compressor 114 is directly coupled to the mixer 12 via a direct mount 200 having first and second mounting flanges 202 and 204. The mounting flanges 202 and 204 may be coupled together via one or more fasteners 206, such as threaded fasteners 208 and 210. For example, the threaded fasteners 208 and 210 may include male and female threaded fasteners, such as bolts and nuts. The male threaded fasteners 208 extend through receptacles 212 in the mounting flanges 202 and 204, while the female threaded fasteners 210 (e.g., nuts) couple to end portions of the fasteners 208. The fasteners 206 may be spaced circumferentially 78 about the axis 66 to couple together the flanges 202 and 204, and thus the mixer 12 and the compressor 114. In some embodiments, the flanges 202 and 204 may be coupled together with a welded joint, a brazed joint, clamps, or other couplings.

In the illustrated embodiment, the mixer 12 includes the first inlet 30 coupled to the exhaust conduit 38 and the first conduit 70 extending along the axis 66 into the chamber 24, the housing 20 or second conduit 72 having the sidewall 68 extending about the first conduit 70, one or more first inlet ports 32 coupled to a first fluid supply 214 via the conduit 42 and the valve 156, one or more second inlet ports 34 coupled to a second fluid supply 216 via the conduit 48 and the valve 156, and one or more third inlet ports 36 coupled to a third fluid supply 218 via the conduit 48 and the valve 156. The fluid supplies 214, 216, and 216 may include any configuration of fluid supplies, such as a fuel supply 44, an air supply 50, a blow-by gas supply 54, an fuel additive supply, an emissions control fluid supply (e.g., a catalyst supply), a combustion moderator or diluent, or any combination thereof. Each of these fluid supplies 214, 216, and 216 may be disposed upstream, downstream, or at a common position relative to one or more of the other fluid supplies 214, 216, and 216. The fluid supplies 214, 216, and 216 also may include one, two, or three types or sources of a particular fluid supply, e.g., one, two, or three types or sources of fuel, oxidant, and blow-by gas. For example, the fuels may include different liquid fuels, different gaseous fuels, or a combination thereof. The oxidants may include air, oxygen, oxygen-enriched air, or other oxygen-containing fluids. The illustrated inlets 32, 34, and 36 are disposed one after another along the sidewall 68, such that the inlets 32 and 34 are disposed about the first conduit 70 and the inlet 36 is disposed downstream from the outlet 86 of the first conduit 70. In other embodiments, the inlet 36 may be disposed along the first conduit 70 or the inlet 34 may be disposed downstream from the outlet 86 of the first conduit 70. In some embodiments, one or more of the inlets 32, 34, and/or 36 may be disposed along the axial end portion 60, such that the inlets 32, 34, and/or 36 are oriented axially 80 into the chamber 24 of the housing 20. In addition, as discussed in detail below, one or more baffles, turning vanes, and/or flow guides 220 and 222 (e.g., annular structures) may be disposed adjacent and/or between the inlets 32, 34, and 36 to help control the flow paths of the exhaust flow 40, a first fluid flow 224 from the inlets 32, a second fluid flow 226 from the inlets 34, and a third fluid flow 226 from the inlets 36. For example, each of the flow guides 220 and 222 may be curved annular flow guides that gradually turn in the downstream direction of flow, while leaving space for flow between the flow guides 220 and 222 and the first conduit 70. In some embodiments, one or both of the flow guides 220 and 222 may be removable inserts, which may be selectively exchanged with a family of different flow guides 220 and 222 having different radii of curvature, different lengths, different dimensions in the axial direction 80, different dimensions in the radial direction 81, different inner diameters, different outer diameters, or any combination thereof. In addition, the first conduit 70 (e.g., alone or coupled to or integral with the axial end portion 60) may be a removable structure, which may be selectively exchanged with a family of different flow conduits 70 having different axial lengths, different diameters, different materials of construction, or any combination thereof. In this manner, the mixer 12 may be selectively modified with various modular components to adjust the velocities of the fluid flows for a particular engine 16, compressor 114, and other aspects of the engine-driven system 10.

The mixer 12 is coupled to the compressor 114, such that the outlet 28 of the mixer 12 is fluidly coupled with a fluid inlet 230 into a fluid inlet duct 232 of the compressor 114. In the illustrated embodiment, the compressor 114 includes a radial compressor having the blades 122 (e.g., impeller blades) coupled to a hub 234 within a chamber 235 of a housing 236, which includes and/or couples to the duct 232 having the flange 204. For example, the duct 232 may be an integral portion of the housing 236 (e.g., one-piece structure). The duct 232 defines an inlet passage 238 extending from the inlet 230 to the chamber 235. The housing 236 extends radially 81 away from the hub 234 and the blades 122 to define a diffuser 240, a collector 241 (e.g., a volute), and a compressed fluid outlet 242. The hub 234 is coupled to the shaft 116, which is supported by one or more bearings 244 and couples to the turbine 112 or another drive (e.g., electric motor or engine 16). As the compressor 114 is driven, the hub 234 and blades 122 rotate to compress the incoming coaxial fluid 89 from the mixer 12, thereby flowing the coaxial fluid 89 radially 81 outward through the diffuser 240, the collector 241, and the outlet 242 as indicated by arrows 245. In the illustrated embodiment, the first conduit 70 of the mixer 12 and the hub 234 of the compressor 114 are disposed in a central region, such that axes 66 of the first conduit 70 and the hub 234 may be aligned with one another (e.g., coaxial). In this manner, the EGR flow 40 from the first conduit 70 may be centrally located in the coaxial fluid flow 89 exiting the mixer 12 and entering the compressor 114, thereby helping to reduce the possibility of droplet formation further away from the axis 66 in the vicinity of compressor blades 122 in the compressor 114.

Figure 6:
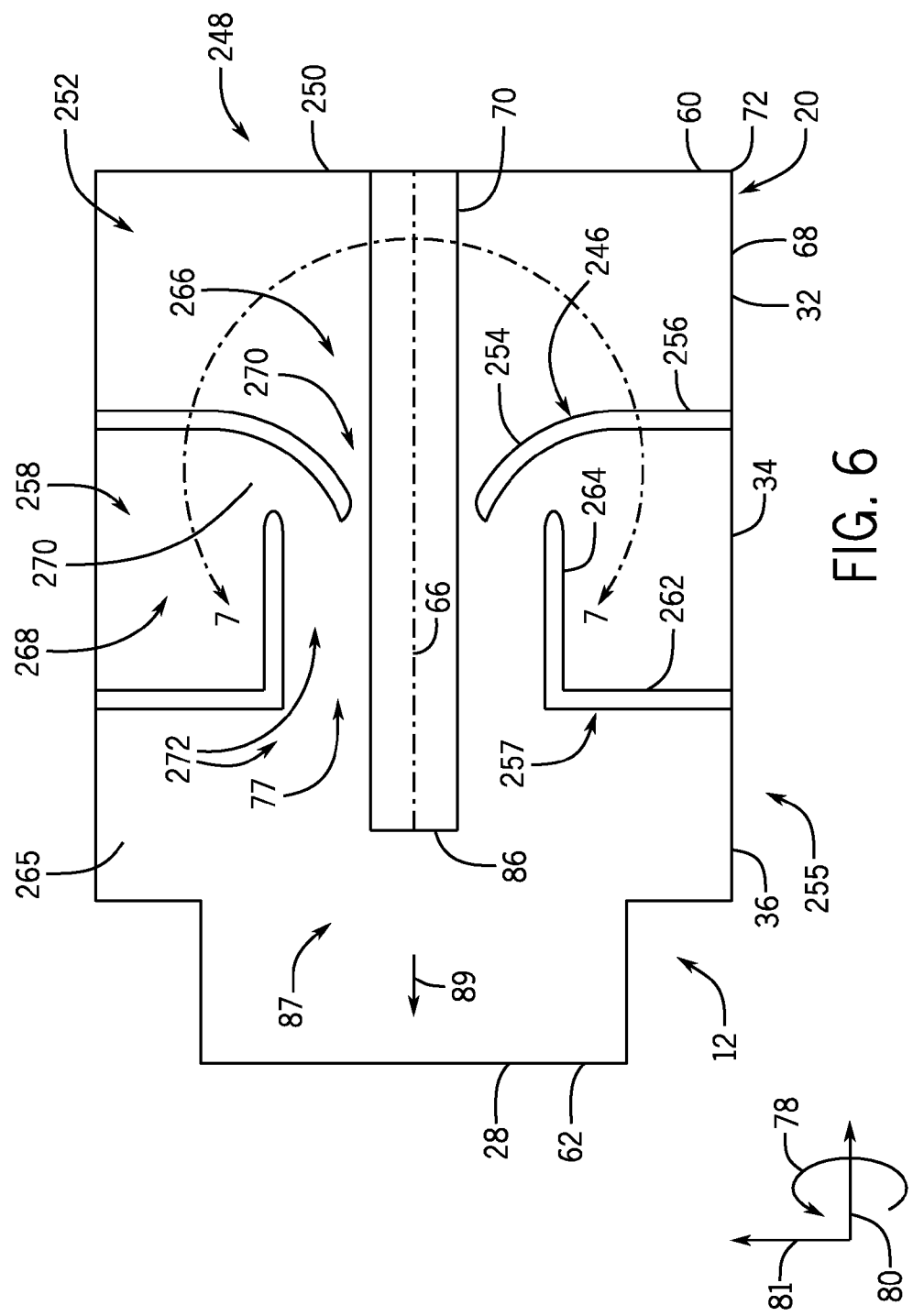
FIG. 6 is a cross-sectional view of an embodiment of a mixer having a removable flow guide (e.g., turning wall insert) and a removable end assembly having a central conduit.

FIG. 6 is a cross-sectional view of an embodiment of a mixer 12 having a removable flow guide 246 (e.g., annular turning wall insert) and a removable end assembly 248 having a central conduit 70 coupled to an end wall 250. The flow guide 246 and the end assembly 248 may be removably coupled to the housing 20 of the mixer 12 via a plurality of fasteners (e.g., threaded fasteners such as bolts), such that the flow guide 246 and the end assembly 248 may be exchanged with a family of different flow guides 246 and a family of different end assemblies 248 to modify the characteristics of the mixer 12. For example, as discussed in detail below, each end assembly 248 may have a conduit 70 of a different axial length, a different outer diameter, a different inner diameter, a different material composition, or any combination thereof. By further example, each flow guide 246 may have a different radius of curvature, a different axial length, a different inner diameter, a different material composition, or any combination thereof.

In some embodiments, the EGR mixer 12 may include a first chamber 252 (e.g., annular chamber) extending around the conduit 70 upstream of a turning wall 254 (e.g., curved annular turning wall) of the flow guide 246, at least one baffle or baffle assembly 255 (e.g., first and second annular baffles 256 and 257) extending around the conduit 70 at least partially downstream of the turning wall 254, and a second chamber 258 (e.g., annular chamber) extending around the at least one baffle 255 downstream of the turning wall 254. The turning wall 254 (e.g., insert 246) may be removably coupled to the housing 20 and may be disposed in the second passage 76 between the first and second conduits 70 and 72. Each of the first and second baffles 256 and 257 may include one or more baffle portions or walls (e.g., annular walls). For example, the second baffle 257 may include a first baffle portion 262 (e.g., first baffle wall) and a second baffle portion 264 (e.g., second baffle wall), which extend circumferentially about the first conduit 70. In the illustrated embodiment, the first baffle 256 and the first baffle portion 262 of the second baffle 257 extend radially 81 inward toward the first conduit 70 crosswise (e.g., perpendicular or acutely angled) relative to the axis 66, and the second baffle portion 264 of the second baffle 257 extends axially 80 along the first conduit 70 (e.g., parallel to the axis 66). The turning wall 254 and baffles 255, 256, and 257 may be configured to enhance flow control through the mixer 12.

The first chamber 252 is coupled to one or more inlets 32, the second chamber 258 is coupled to one or more inlets 34, and a third chamber 265 is coupled to one or more inlets 36. As discussed above, each of these inlets 32, 34, and 36 may be coupled to any arrangement or combination of fluids, such as fuel, air, blow-by gas, fuel additives, moderators or diluents, catalysts, or any combination thereof. The turning wall 254 and baffles 255, 256, and 257 may help to guide the flows, regulate the flows. In some embodiments, the fluid flow may enter a variety of flow passages 266 (e.g., annular passages), including one or more converging passages 268, restricted passages 270, and diverging passages 272 in the direction of flow. The flow passages 266 may be disposed upstream or downstream of the first region 77. In the illustrated embodiment, the baffle 256 and turning wall 254 collectively define an annular wall structure separating the first and second chambers 252 and 258, while guiding fluid flow from the inlets 32 to gradually converge between the turning wall 254 and the first conduit 70, followed by divergence or expansion downstream of the turning wall 254. The second baffle 257 (including baffle walls 262 and 264) collectively define an annular wall structure separating the second and third chambers 258 and 265, while guiding fluid flow from the inlets 34 to converge between the baffles 256 and 267 toward the first conduit 70, followed by divergence or expansion downstream of the turning wall 254 between the baffle wall 264 and the first conduit 70. In this first region 77, the fluids from the inlets 32 and 34 undergo mixing, which is enhanced by the various turns, converging, restricted, and diverging flow passages. The mixer 12 introduces fluid from the inlet 36 downstream of the second baffle 257. In this first region 77, the fluids from the inlets 32 and 34 (already partially mixed together) further mix with the fluid from the inlet 36 within the second conduit 72. The fluids from the inlets 32, 34, and 36 remain substantially separated from the fluid (e.g., EGR gas 40) from the outlet 86 of the first conduit 70 in the second region 87, thereby producing the coaxial fluid 89. Again, in certain embodiments, the axial end portion 62 may include the mounting flange 202 configured to directly couple to the mounting flange 204 of the compressor 114.

Figure 7:
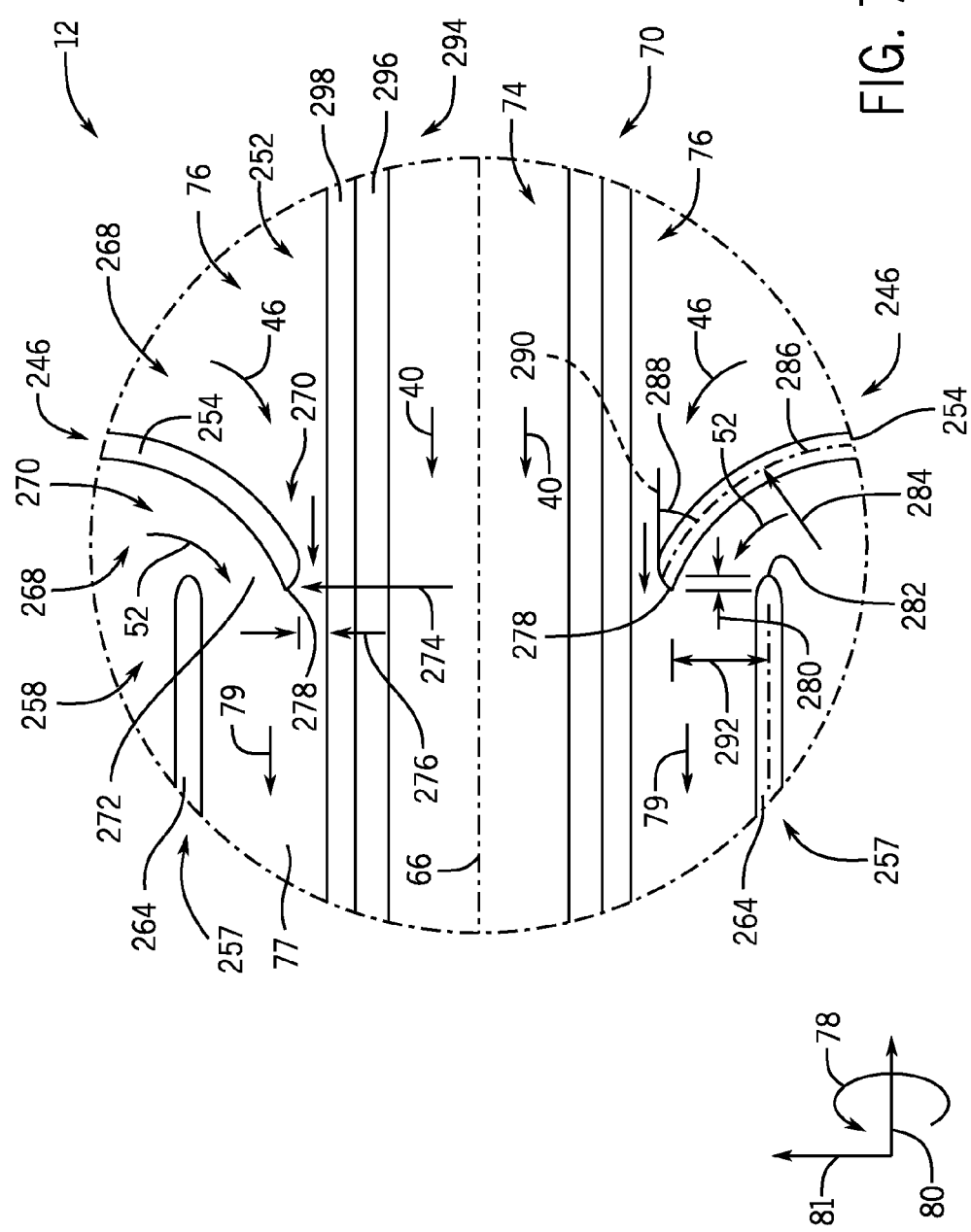
FIG. 7 is a cross-sectional view of an embodiment of the mixer taken within line 7-7 of FIG. 6.

FIG. 7 is a cross-sectional view of an embodiment of the mixer 12 taken within line 7-7 of FIG. 6, illustrating the fluid flows (e.g., fuel and air flows) from inlets 32 and 34, through chambers 252 and 258, along the flow guide 246 (e.g., turning wall 254), between baffles 255 (e.g., 256, 257, 262, and 264), and along the first conduit 70. Again, the flow guide 246 may be removably mounted in the second passage 76 of the mixer 72 (e.g., removably coupled to first baffle 256), such that the flow guide 246 may be selectively exchanged with a family of different flow guides 246 having different geometries of the turning wall 254. The different geometries of the turning wall 254 may include an inner diameter or radius 274, a radial offset 276 between a downstream edge or tip 278 of the turning wall 254 and the first conduit 70, an axial offset 280 between the tip 278 and an upstream edge or tip 282 of the second baffle portion 264 of the second baffle 257, a radius of curvature 284 along a camber line 286 of the turning wall 254, an angle 288 between the camber line 286 and an axial line 290 (e.g., parallel to axis 66) at the tip 290 of the turning wall 254, and a radial offset 292 between the tips 278 and 282. The radial offset 276 may be between 1 to 50, 1 to 25, or 1 to 10 percent of the radius 274. For example, the radial offset 276 may be less than or equal to approximately 1, 2, 3, 4, 5, 6, 7, 8, 9, 10, 15, or 20 percent of the radius 274. The axial offset 280 may be 0 or plus/minus approximately 1, 2, 3, 4, 5, 6, 7, 8, 9, 10, 15, or 20 percent of the radius 274. For example, the tip 282 may be disposed at the axial offset 280 downstream from the tip 278, or the tip 282 may be disposed at the axial offset 280 upstream from the tip 278 as illustrated in FIG. 7. The radial offset 292 may be between 1 to 50, 1 to 25, 1 to 15, or 5 to 10 percent of the radius 274. For example, the radial offset 292 may be less than or equal to approximately 1, 2, 3, 4, 5, 6, 7, 8, 9, 10, 15, or 20 percent of the radius 274. The radius of curvature 284 may be between approximately 0.5 to 20, 1 to 10, or 2 to 5 times the radius 274 of the turning wall 254 at the tip 278. The angle 288 of the turning wall 254 may be an acute angle less than 90 degrees, such as between approximately 0 to 80, 1 to 60, 5 to 45, or 10 to 30 degrees. For example, the angle 288 may be less than or equal to 5, 10, 15, 20, 25, 30, 45, or 60 degrees. By exchanging the flow guide 246 with different geometries of the turning wall 254, in combination with geometries of the baffles 255 and first conduit 70, adjustments may be made to the flow passages 266 (e.g., annular flow passages), such as the one or more converging passages 268, restricted passages 270, and diverging passages 272.

As illustrated in FIG. 7, the radius of curvature 284, the angle 288, and the first conduit 70 define the converging passage 268 through the first chamber 252, and thus these parameters may be adjusted to increase or decrease the rate of convergence through the passage 268. The converging passage 268 extends toward the restricted passage 270 between the tip 278 and the first conduit 70, and the radial offset 276 may be adjusted to increase or decrease the degree of restriction through the passage 270. Similarly, the radius of curvature 284, the first baffle 256, and the second baffle 257 define the converging passage 268 through the second chamber 258, and thus these parameters may be adjusted to increase or decrease the rate of convergence through the passage 268. The converging passage 268 extends toward the restricted passage 270 between the turning wall 254, the first conduit 70, and the second baffle portion 264 of the second baffle 257, such that the offsets 280 and 292 may be adjusted to increase or decrease the degree of restriction through the passage 270. As discussed in further detail below, the flow guide 246 may be selected from a family of different flow guides 246, inserted in an axial direction 80 into the chamber 24 of the housing 20 (e.g., passage 76), and removably coupled to the housing 20 (e.g., first baffle 256).

Similarly, as discussed in further detail below, the first conduit 70 may be part of the removable end assembly 248, which may be exchanged with an end assembly 248 selected from a family of different end assemblies 248. In the illustrated embodiment, the first conduit 70 a plurality of walls or layers 294, such as walls or layers 296 and 298, disposed circumferentially 78 about the axis 66. For example, the walls or layers 294 may be annular conduit walls and/or layers made of metal, ceramic, plastic, or any combination thereof. For example, the walls or layers 296 and/or 298 may include a wear resistant layer, an erosion resistant layer, a corrosion resistant layer, an thermal insulation layer, a catalyst layer, or any combination thereof. For example, the layers 296 and/or 298 may include layers (e.g., coatings) made of a carbide (e.g., tungsten carbide), aluminum, stainless steel, or any combination thereof. In certain embodiments, the layer 296 may be a metal layer while the layer 298 may be a thermal insulation layer, or vice versa. The walls or layers 296 and 298 may be removably coupled together, fixedly coupled together, or integrally formed together. For example, one of the layers 296 or 298 may be extruded to form a structural wall (e.g., annular metal wall) of the conduit 70, while the other of the layers 296 or 298 may be coated onto the wall (e.g., via spray coating, dipping, brushing, etc.). By further example, one of the layers 296 or 298 may be a sleeve that fits about a circumference (e.g., inner or outer circumference) of the other layer. By further example, the layers 296 and 298 may be coextruded to form the conduit 70. The layers 296 and 298 may have equal or different thicknesses. For example, one of the layers 296 or 298 may have a first thickness that is less than approximately 5, 10, 15, 20, 25, 30, 40, or 50 percent of a second thickness of the other layer.

Figure 8:
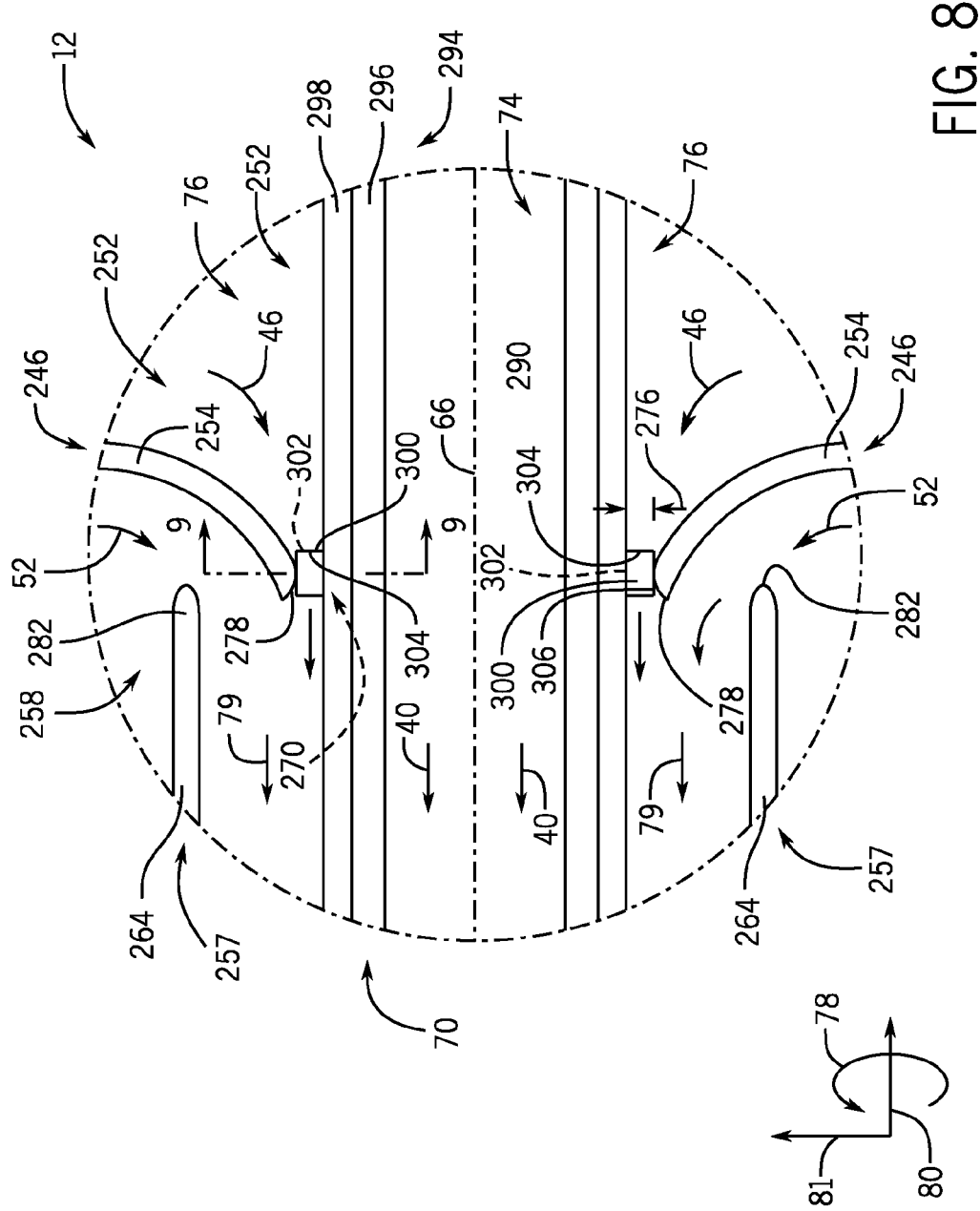
FIG. 8 is a cross-sectional view of an embodiment of the mixer taken within line 7-7 of FIG. 6.

FIG. 8 is a cross-sectional view of an embodiment of the mixer 12 taken within line 7-7 of FIG. 6. The embodiment of FIG. 8 is substantially the same as the embodiment of FIG. 7, except that the mixer 12 includes a plurality of radial spacers 300 and intermediate openings 302 disposed circumferentially about the first conduit 70. More specifically, the spacers 300 extend radially 81 across the radial offset 276 between the tip 278 of the flow guide 246 (e.g., turning wall 254) and the first conduit 70, thereby helping to center and uniformly space the flow guide 246 about the first conduit 70. For example, during axial 80 insertion of the removable flow guide 246, the spacers 300 may help to guide the flow guide 246 into position about the first conduit 70 via a tapered guide portion 302 leading to a support portion 304. The spacers 300 may include any number, such as 2 to 100, 4 to 50, or 8 to 20 spacers 300. Likewise, the spacers 300 may be circumferentially 78 offset from one another to define the intermediate openings 302, such as 2 to 100, 4 to 50, or 8 to 20 openings 302. The spacers 300 and openings 302 may be uniformly sized and spaced about the conduit 70 to define a segmented restricted passage 270. In certain embodiments, the spacers 300 may be removably or fixedly coupled to one or both of the first conduit 70 or the tip 278 of the flow guide 246. For example, in the illustrated embodiment, the spacers 300 may be removably or fixedly coupled to the first conduit 70 via fasteners (e.g., threaded fasteners), a welded joint, or brazed joint, or an integral construction (e.g., one-piece structure having conduit 70 with spacers 300). In such an embodiment, after insertion of the flow guide 246, the spacers 300 may be removably coupled to the tip 278 of the fluid guide 246 via an interference fit. In another embodiment, the spacers 300 may be removably or fixedly coupled to the flow guide 246 (e.g., turning wall 254) via fasteners (e.g., threaded fasteners), a welded joint, or brazed joint, or an integral construction (e.g., one-piece structure having flow guide 246 with spacers 300). In such an embodiment, after insertion of the flow guide 246, the spacers 300 may be removably coupled to the first conduit 70 via an interference fit.

Figure 9:
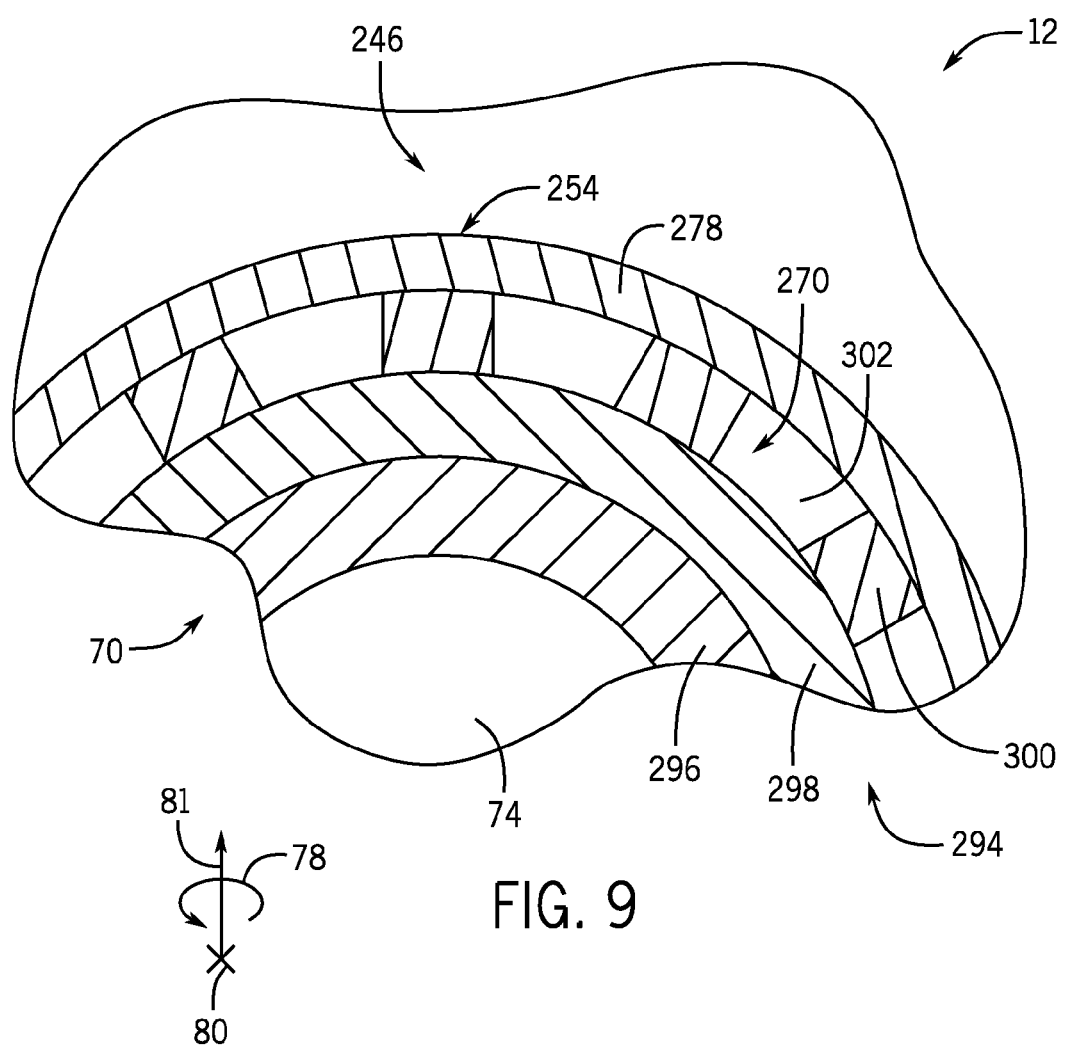
FIG. 9 is a cross-sectional view of an embodiment of the mixer taken along line 9-9 of FIG. 8.

FIG. 9 is a cross-sectional view of an embodiment of the mixer 12 taken within line 9-9 of FIG. 8, illustrating details of the spacers 300 and intermediate openings 302. As illustrated, the spacers 294 are disposed radially 81 between the first conduit 70 and the tip 278 of the flow guide 246 (e.g., turning wall 254), thereby defining the segmented restricted passage 270. Again, the mixer 12 may include any number of uniformly or non-uniformly spaced spacers 300 and openings 302, such as 2 to 100, 4 to 50, or 8 to 20. The spacers 300 may have a cross-sectional shape 306 that is rectangular, triangular, curved, or any combination thereof.

FIG. 10 is an exploded schematic cross-sectional view of a mixer 12, illustrating a family 310 of removable flow guides 246 (e.g., turning wall inserts) and a family 312 of removable end assemblies 248 with central conduits 70. In the illustrated embodiment, the family 310 of removable flow guides 246 (e.g., turning walls 254) have different radii of curvature 284, different inner radii 274 or diameters 314, and/or different axial lengths 316. The family 312 of removable end assemblies 248 have conduits 70 with different radii or diameters 318 (e.g., inner or outer diameters) and/or different axial lengths 320. The families 310 and 312 also may have different materials of construction (e.g., metal, ceramic, plastic, etc.), different treatments (e.g., wear resistant coatings, erosion resistant coatings, corrosion resistant coatings, catalyst coatings, thermal insulation coatings, etc.), or any combination thereof. The different parameters (e.g., 284, 314, 316, 318, and 320) may be adjusted to change the flow characteristics in the mixer 12. In certain embodiments, the ratio of the length 316 to the diameter 314 may be approximately 10:1 to 1:1, 8:1 to 2:1, 6:1 to 3:1, and all ranges therebetween. Similarly, the ratio of the length 320 to the diameter 318 may be approximately 20:1 to 1:1, 15:1 to 1.5:1, 10:1 to 2:1, 5:1 to 3:1, and all ranges therebetween.

The removability and exchangeability of the flow guides 246 and the end assemblies 248 creates a family 322 of modular mixers 12. In the illustrated embodiment, each flow guide 246 has a first mounting portion or flange 324 that mates with a second mounting portion or flange 326 on the mixer 12, e.g., on the first baffle 256. The flanges 324 and 326 are removably coupled together via a plurality of fasteners 328 (e.g., male threaded fasteners such as bolts) that engage fastener receptacles 330 (e.g., female threaded fasteners). Similarly, each end assembly 248 has a first mounting portion or flange 332 that mates with a second mounting portion or flange 334 on the mixer 12, e.g., on the end portion 60. The flanges 332 and 334 are removably coupled together via a plurality of fasteners 336 (e.g., male threaded fasteners such as bolts) that engage fastener receptacles 338 (e.g., female threaded fasteners). In certain embodiments, each end assembly 248 may have a multi-piece or one-piece construction of the end wall 250 and the first conduit 70. For example, the first conduit 70 may be coupled to the end wall 250 at a joint or coupling 340, which may be a fixed coupling or a removable coupling. The coupling 340 may include a welded joint, a brazed joint, an interference fit, a threaded joint, or a one-piece construction (e.g., cast as one-piece) of the end wall 250 and the first conduit 70.

Technical effects of the disclosed embodiments include a system having an EGR mixer 12, which includes a housing 20 and a first passage 74 to supply an EGR flow 40 into the housing 20, and a second passage 76 disposed about the first passage 74. The second passage 74 may supply at least one fluid into the housing 20. The at least one fluid is supplied via an arrangement of inlets 32, 34, and/or 36, which may be configured to control the flow paths of fluids (e.g., exhaust gas, fuel, air, and/or blow-by gases) by controlling the order the fluids are introduced to the mixer, the distribution of the different fluids, and so forth. The system also includes a region 87 downstream from the first and second passages 74 and 76, and a fluid outlet 28 from the region 87. The EGR mixer 12 then feeds a coaxial fluid 89 into a turbomachine, such as a compressor 114, having a plurality of blades. The EGR mixer 12 directs the coaxial fluid 89 to a central region of the turbomachine, such that liquid formation (e.g., water droplets) is minimized in the vicinity of the blades, thereby helping to protect the blades and increase the life of the turbomachine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an exhaust gas recirculation (EGR) mixer, comprising:
      a housing;
      a first passage in the housing, wherein the first passage is configured to supply an EGR flow into the housing, wherein the first passage extends through a straight conduit that protrudes a distance into the housing;
      a second passage in the housing, wherein the second passage is disposed about the first passage, the second passage is configured to supply at least one fluid flow into the housing, and at least one of the straight conduit or a turning wall disposed in the second passage is removably coupled to the housing;

a region in the housing downstream from the first and second passages, wherein the region is configured to receive the EGR flow and the at least one fluid flow at substantially equal velocities; and a fluid outlet downstream from the region.

2. The system of claim 1, wherein the first passage is oriented in an axial direction toward the fluid outlet, and the first and second passages are substantially coaxial with one another.

3. The system of claim 1, wherein the first passage extends through the straight conduit downstream from a curved conduit, and the straight conduit has a length sufficient to substantially straighten the EGR flow prior to exiting the straight conduit into the region in the housing.

4. The system of claim 1, wherein the turning wall is removably coupled to the housing.

5. The system of claim 1, wherein the turning wall extends around the straight conduit, wherein the EGR mixer comprises a first chamber extending around the straight conduit upstream of the turning wall, a baffle extending around the straight conduit at least partially downstream of the turning wall, and a second chamber extending around the baffle downstream of the turning wall.

6. The system of claim 1, wherein the straight conduit comprises a thermal insulation material disposed along a conduit wall.

7. The system of claim 1, wherein the straight conduit is removably coupled to the housing.

8. The system of claim 1, wherein the second passage is configured to supply the at least one fluid flow of a fuel, air, a blow-by gas from a combustion chamber of an engine, or a combination thereof.

9. The system of claim 1, wherein the EGR mixer comprises a fuel inlet and an air inlet into the second passage.

10. The system of claim 9, wherein the EGR mixer comprises a blow-by gas inlet into the housing downstream from the air inlet.

11. The system of claim 1, wherein the EGR mixer comprises a fuel/air mixture inlet into the second passage.

12. The system of claim 1, wherein the substantially equal velocities are configured to reduce mixing between the EGR flow and the at least one fluid flow to reduce droplet formation in the EGR flow.

13. The system of claim 1, comprising an engine, a compressor, or a combination thereof, coupled to the EGR mixer.

14. A system, comprising:
an exhaust gas recirculation (EGR) mixer, comprising:
  a housing;
  an EGR conduit protruding into the housing, wherein the EGR conduit is configured to supply an EGR flow into the housing;
  a turning wall disposed about the EGR conduit;
  a first chamber disposed about the EGR conduit upstream of the turning wall;
  a first fluid inlet into the first chamber;
  a second chamber disposed about the EGR conduit downstream of the turning wall;
  a second fluid inlet into the second chamber;
  a region in the housing downstream from the EGR conduit and the second chamber, wherein the region is configured to receive the EGR flow and a fluid flow from the second chamber at substantially equal velocities; and
  a fluid outlet downstream of the EGR conduit, the first fluid inlet, the second fluid inlet, and the region.

15. The system of claim 14, wherein the substantially equal velocities are configured to reduce mixing between the EGR flow and the at least one fluid flow to reduce droplet formation in the EGR flow.

16. A method, comprising:
flowing an exhaust gas recirculation (EGR) flow through a first passage into a housing of an EGR mixer;
flowing at least one fluid flow through a second passage into the housing of the EGR mixer, wherein the second passage is disposed about the first passage;
receiving the EGR flow and the at least one fluid flow at substantially equal velocities into a region downstream from the first and second passages; and
outputting the EGR flow and the at least one fluid flow through a fluid outlet downstream from the region.

17. The method of claim 16, wherein receiving the EGR flow and the at least one fluid flow at substantially equal velocities comprises reducing mixing between the EGR flow and the at least one fluid flow.

18. The method of claim 17, wherein reducing mixing between the EGR flow and the at least one fluid comprises reducing cooling of the EGR flow by the at least one fluid flow to reduce droplet formation in the EGR flow.

19. A system, comprising:
an exhaust gas recirculation (EGR) mixer, comprising:
  a housing;
  a first passage in the housing, wherein the first passage is configured to supply an EGR flow into the housing, wherein the first passage extends through a straight conduit that protrudes a distance into the housing;
  a second passage in the housing, wherein the second passage is disposed about the first passage, and the second passage is configured to supply at least one fluid flow into the housing;
  a region in the housing downstream from the first and second passages, wherein the region is configured to receive the EGR flow and the at least one fluid flow;
  a fluid outlet downstream from the region; and
  a turning wall disposed in the second passage, wherein the turning wall is annular about the straight conduit.

20. A system, comprising:
an exhaust gas recirculation (EGR) mixer, comprising:
  a housing;
  a first passage in the housing, wherein the first passage is configured to supply an EGR flow into the housing;
  a second passage in the housing, wherein the second passage is disposed about the first passage, and the second passage is configured to supply at least one fluid flow into the housing;
  a region in the housing downstream from the first and second passages, wherein the region is configured to receive the EGR flow and the at least one fluid flow;
  a fluid outlet downstream from the region; and
  a plurality of turning walls disposed in the second passage, wherein at least two of the plurality of turning walls are axially offset from one another.

21. A system, comprising:
an exhaust gas recirculation (EGR) mixer, comprising:
  a housing;
  a first passage in the housing, wherein the first passage is configured to supply an EGR flow into the housing, wherein the first passage extends through a straight conduit that protrudes a distance into the housing, and the straight conduit comprises thermal insulation along a conduit wall;

a second passage in the housing, wherein the second passage is disposed about the first passage, and the second passage is configured to supply at least one fluid flow into the housing;
a region in the housing downstream from the first and second passages, wherein the region is configured to receive the EGR flow and the at least one fluid flow; and
a fluid outlet downstream from the region.

* * * * *